US008610929B2

(12) United States Patent
Terao

(10) Patent No.: US 8,610,929 B2
(45) Date of Patent: Dec. 17, 2013

(54) IMAGE PROCESSING APPARATUS, CONTROL METHOD THEREFOR, AND PROGRAM

(75) Inventor: Yoshihide Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 446 days.

(21) Appl. No.: 12/904,951

(22) Filed: Oct. 14, 2010

(65) Prior Publication Data

US 2011/0090534 A1  Apr. 21, 2011

(30) Foreign Application Priority Data

Oct. 16, 2009  (JP) ................................ 2009-239402

(51) Int. Cl.
*G06F 3/12* (2006.01)
(52) U.S. Cl.
USPC .......... 358/1.15; 358/1.9; 358/1.13; 358/400; 358/474
(58) Field of Classification Search
None
See application file for complete search history.

(56) References Cited

U.S. PATENT DOCUMENTS

| 5,480,240 | A  | * | 1/1996 | Bolash et al. ............ 400/124.01 |
| 6,463,435 | B1 | * | 10/2002 | Bergmans ............................. 1/1 |
| 6,545,767 | B1 | * | 4/2003 | Kuroyanagi ................. 358/1.14 |
| 7,202,962 | B2 | * | 4/2007 | Roosen et al. ............... 358/1.15 |
| 7,603,649 | B2 | * | 10/2009 | Poindexter et al. ........... 717/102 |
| 7,701,617 | B2 | * | 4/2010 | Johnson et al. ............... 358/406 |
| 7,840,891 | B1 | * | 11/2010 | Yu et al. ........................ 715/223 |
| 8,085,445 | B2 | * | 12/2011 | Brown .......................... 358/405 |
| 2011/0157659 | A1 | * | 6/2011 | Zenju ............................ 358/474 |

FOREIGN PATENT DOCUMENTS

| JP | 2008-145611 A | 6/2008 |
| JP | 2008-299499 A | 12/2008 |
| JP | 2009-194824 A | 8/2009 |

OTHER PUBLICATIONS

Japanese Office Action issued on Jul. 23, 2013 in corresponding application No. 2009-239402.

\* cited by examiner

*Primary Examiner* — Steven Kau
*Assistant Examiner* — Ashish K Thomas
(74) *Attorney, Agent, or Firm* — Carter, DeLuca, Farrell & Schmidt LLP

(57) ABSTRACT

An image processing apparatus includes a storage destination setting unit that sets a storage destination for storing image data acquired by reading an image of a document. An input unit is configured to input first image data and second image data. A determination unit acquires processing instruction information by analyzing the second image data and determines whether a description included in a processing target field of the first image data is appropriate. A transmission unit transmits the first image data to the storage destination. A generation unit generates processing instruction information to be used in re-storage processing, and an output unit outputs data including the processing instruction information to a printing unit.

9 Claims, 21 Drawing Sheets

FIG.2A

INVOICE (MONTH)　　(DAY),　　(YEAR)
INVOICE NO.

TO: Mr./Ms. _____

XYZ CORPORATION
CONTACT PERSON:
CONTACT ADDRESS:
   ABC-CHO 11-11-11, DEF-KU, TOKYO
TEL:　　　　FAX:

PLEASE VERIFY THE FOLLOWING
CONTENT OF THIS INVOICE.

| SUBJECT | |
|---|---|
| TOTAL AMOUNT | YEN |

BANK TRANSFER　BANK NAME　　　　BRANCH NAME
ACCOUNT　　　　ACCOUNT TYPE: ORDINARY/ACCOUNT CURRENT
PAYMENT CONDITION

| CODE | QUANTITY/REMARKS | QUANTITY | UNIT | UNIT PRICE | TOTAL PRICE |
|---|---|---|---|---|---|
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  | SUBTOTAL |
|  |  |  |  |  | CONSUMPTION TAX |
|  |  |  |  |  | TOTAL CHARGE |

DESCRIPTION

| SEAL | SEAL | SEAL |
|---|---|---|

XYZ CORPORATION

FIG.2B

| INVOICE |
|---|

(MONTH) (DAY), (YEAR)
INVOICE NO.

TO: Mr./Ms. _____

XYZ CORPORATION
CONTACT PERSON:
PLEASE VERIFY THE FOLLOWING     CONTACT ADDRESS:
CONTENT OF THIS INVOICE.                 ABC-CHO 11-11-11, DEF-KU, TOKYO
TEL:            FAX:

| SUBJECT | | ← 31 |
|---|---|---|
| TOTAL AMOUNT | YEN | ← 32 |

BANK TRANSFER   BANK NAME         BRANCH NAME
ACCOUNT         ACCOUNT TYPE: ORDINARY/ACCOUNT CURRENT
PAYMENT CONDITION

| CODE | QUANTITY/REMARKS | QUANTITY | UNIT | UNIT PRICE | TOTAL PRICE |
|---|---|---|---|---|---|
| | | | | | |
| | | | | | SUBTOTAL |
| | | | | | CONSUMPTION TAX |
| | | | | | TOTAL CHARGE |

| DESCRIPTION | |
|---|---|

| SEAL | SEAL | SEAL | ← 33

| XYZ CORPORATION |
|---|

FIG.2C

| INVOICE | | |
|---|---|---|
| | (MONTH) (DAY), (YEAR) | |
| | INVOICE NO. | |

TO: Mr./Ms. _____

XYZ CORPORATION
CONTACT PERSON:
PLEASE VERIFY THE FOLLOWING   CONTACT ADDRESS:
CONTENT OF THIS INVOICE.      ABC-CHO 11-11-11, DEF-KU, TOKYO
TEL:       FAX:

| SUBJECT | | ← 41 |
|---|---|---|
| TOTAL AMOUNT | *100,000.000* YEN | ← 42 |

BANK TRANSFER   BANK NAME       BRANCH NAME
ACCOUNT          ACCOUNT TYPE: ORDINARY/ACCOUNT CURRENT
PAYMENT CONDITION

| CODE | QUANTITY/REMARKS | QUANTITY | UNIT | UNIT PRICE | TOTAL PRICE |
|---|---|---|---|---|---|
| *7/* | *× × 000* | *3* | *7·2* | *300,000* | *3500,000* |
| | | | | | |
| | | | | | |
| | | | | | |
| | | | | | |
| | | | | | |
| | | | | | |
| | | | | SUBTOTAL | |
| | | | | CONSUMPTION TAX | |
| | | | | TOTAL CHARGE | |

| DESCRIPTION | |
|---|---|

| SEAL | SEAL | Ⓐ | ← 43

| XYZ CORPORATION |
|---|

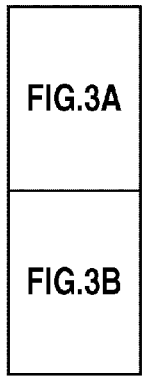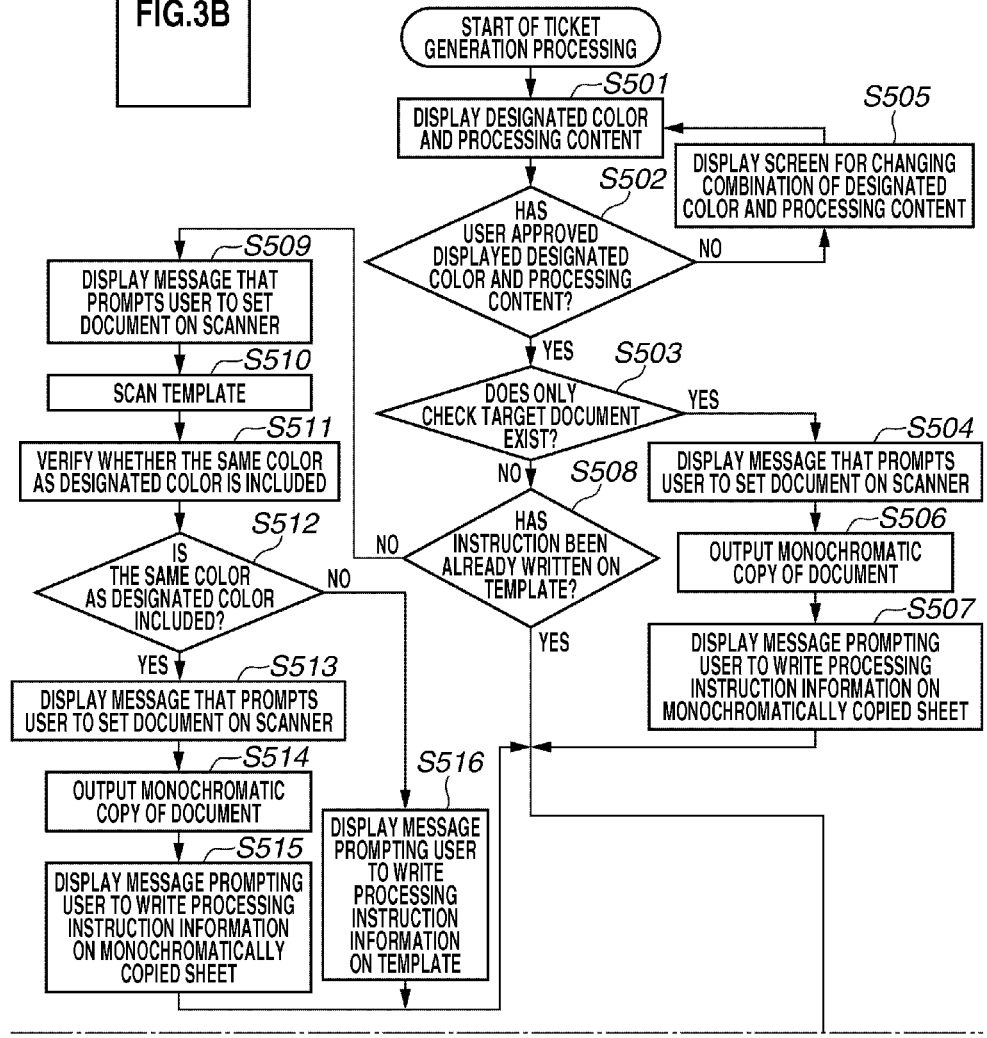

FIG.9

| ENTER ADDRESS | |
|---|---|
| HOST NAME ▶ | 172.24.11.11 |
| FOLDER PATH ▶ | ¥tmp |
| USER NAME ▶ | user |
| PASSWORD ▶ | ***** |
| CANCEL | CLOSE |

FIG.10C

Scan Ticket

CREATION DATE: YYYY/MM/DDD
CREATOR: △△ □□

— 850 (QR code)

1100 — (Invoice image)

PRINT SETTING INFORMATION

CHECK AREA 1
START POINT: (1108.963)
WIDTH: 834
HEIGHT: 128
PROCESSING DESCRIPTION: NONE
— 1101

CHECK AREA 2
START POINT: (1240.983)
WIDTH: 740
HEIGHT: 100
PROCESSING DESCRIPTION: DESCRIPTION INCLUDED
— 1102

CHECK AREA 3
START POINT: (2955.2050)
WIDTH: 200
HEIGHT: 171
PROCESSING DESCRIPTION: SEAL INCLUDED
— 1103

TRANSMISSION ADDRESS INFORMATION
HOST NAME: 172.20.11.11
FOLDER PATH: ¥tmp
USER NAME: user
PASSWORD: xxxx
— 1104

PAGE NUMBER OF PAGE WHOSE RESULT OF CHECKING IS NEGATIVE
PAGE NUMBER(S):
PAGES 6, 7, AND 18
— 1105

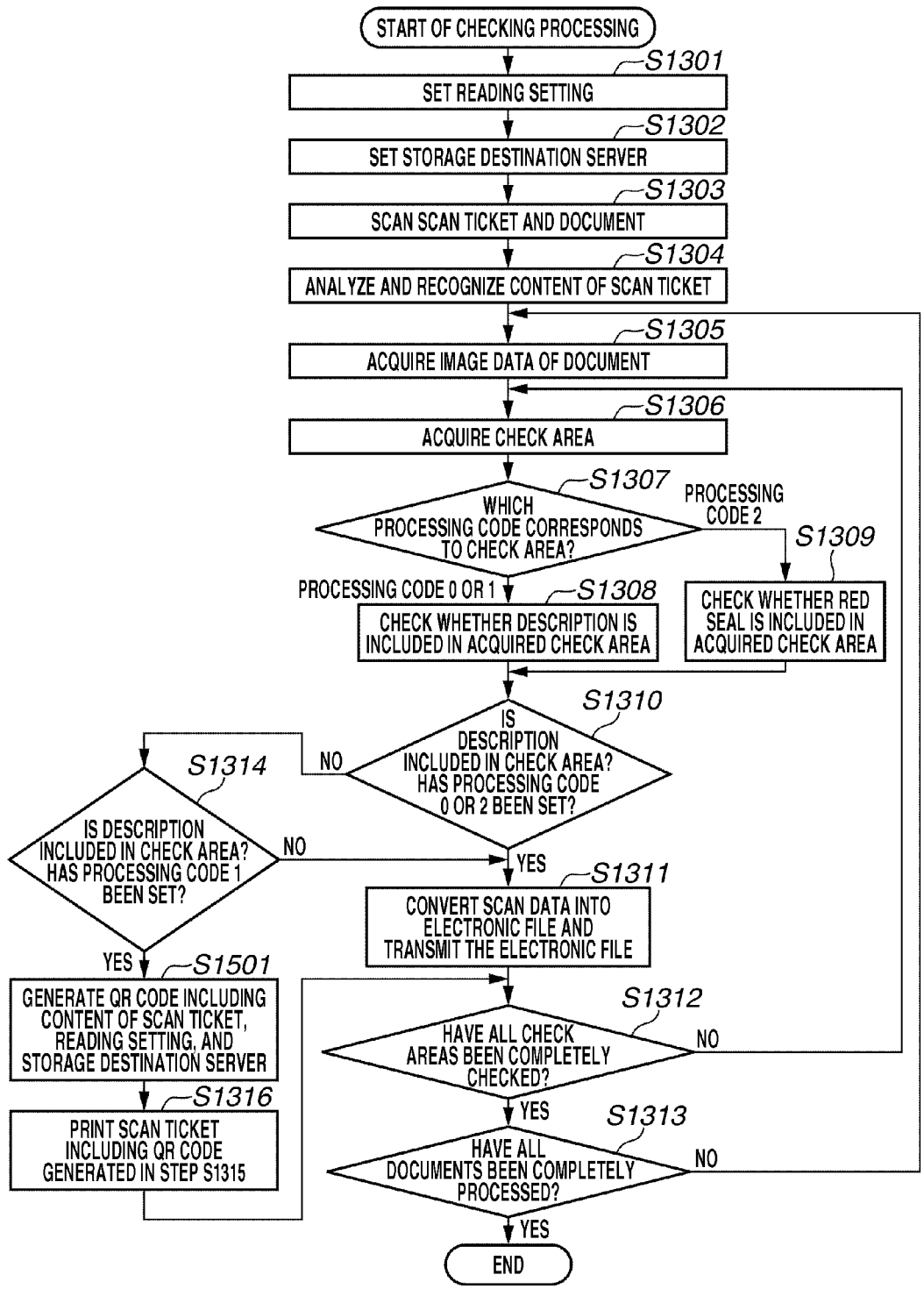

FIG.13

| DATA DESCRIBED IN SCAN TICKET | | |
|---|---|---|
| STORAGE DESTINATION SERVER SETTING | ON | OFF |
| READING SETTING | ON | OFF |
| PAGE NUMBER OF PAGE(S) WHOSE RESULT OF CHECKING IS NEGATIVE | ON | OFF |
| | | CLOSE |

1701

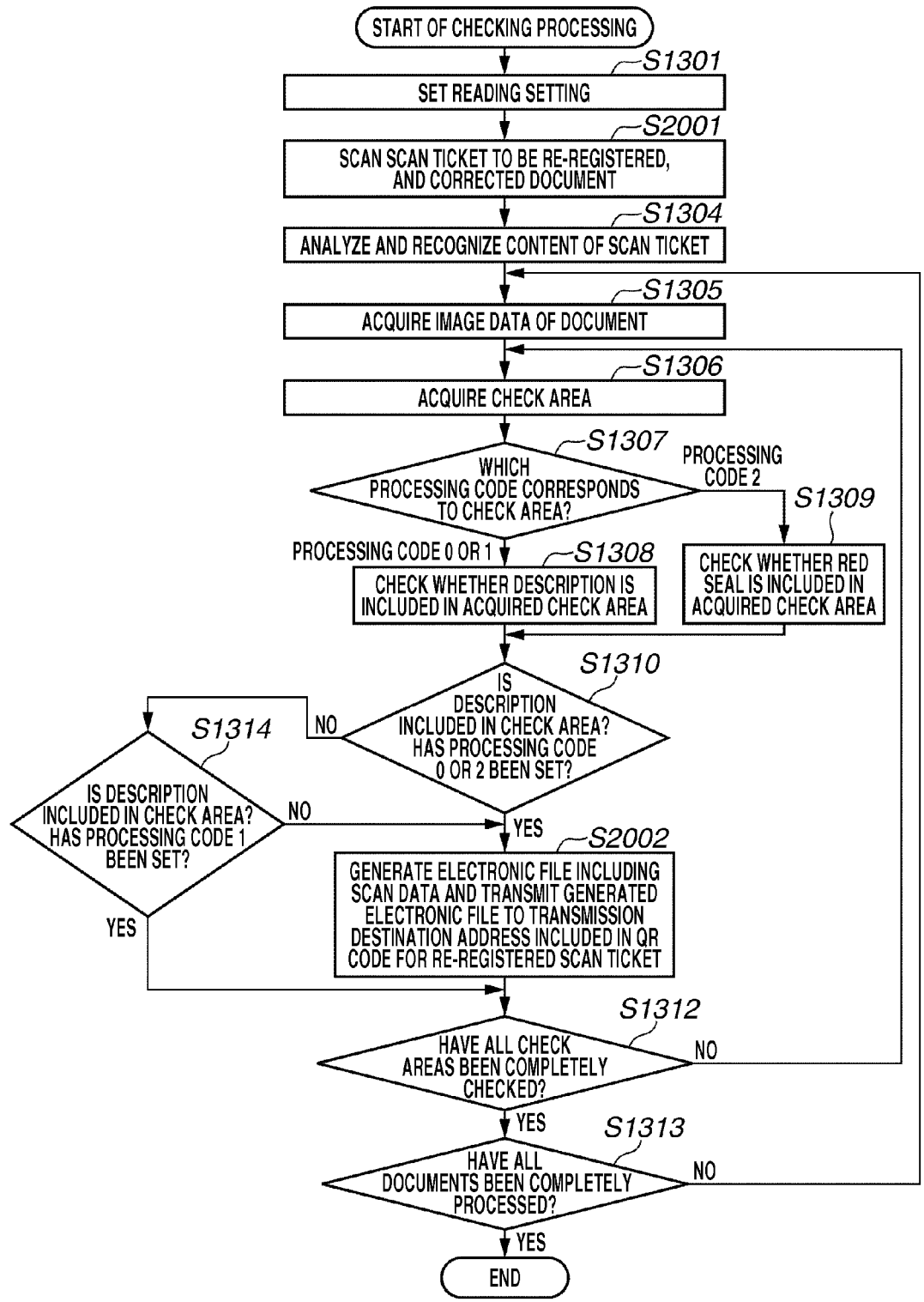

IMAGE PROCESSING APPARATUS, CONTROL METHOD THEREFOR, AND PROGRAM

BACKGROUND OF THE INVENTION

1. Field of the Invention

The present invention relates to an image processing apparatus and a control method therefor configured to process image data acquired by reading an image of a document and to a program storing instructions that implement the control method.

2. Description of the Related Art

A conventional method reads a document, such as a business form, by using a scanner and extracts an amount of money and the date and time described in the document. By using the conventional method like this, it becomes possible to easily utilize and accumulate data extracted from a large number of business forms.

More specifically, Japanese Patent Application Laid-Open No. 2008-145611 discusses the following method for generating a processing instruction sheet. In this conventional method, a user enters processing instruction information that describes a field to be processed and the content of the processing in the document to be processed by hand. The processing target document including the processing instruction information is read by using a scanner. Thus, the above-described conventional method identifies the processing target field and the processing content and generates a processing instruction sheet based on the identified information. Furthermore, the conventional method discussed in Japanese Patent Application Laid-Open No. 2008-145611 extracts the information written in the processing target field of the check target document by using the generated processing instruction sheet.

Suppose that the above-described conventional method is used in a case where information written in a processing target field of a document by using a processing instruction sheet is checked as to whether a signature or a seal has been provided at a predetermined position. In this case, that a document whose result of the checking is positive is converted into an electronic format as a file and the file is stored in a network folder.

In addition, suppose in this case that a document whose result of checking is negative is corrected, the corrected document is checked by using the processing instruction sheet again, and the corrected document is converted into an electronic format as a file. The file of the corrected document is stored in the same network folder as that storing the document whose result of the first check operation is positive. In the above-described case, the following problems may arise.

More specifically, in this case, the user may not remember which folder has stored the file because longtime has passed since the time at which the document is checked by the first check operation. Furthermore, even when the user remembers the folder storing the document checked by the first check operation whose result of checking is positive, it becomes necessary for the user to search for and select the concerned folder again.

SUMMARY OF THE INVENTION

The present invention is directed to provide an image processing apparatus and a control method therefor capable of reducing the trouble of the user to execute complicated operations in generating and storing an electronic file of a corrected document and to a program of the control method.

According to an aspect of the present invention, an image processing apparatus includes a storage destination setting unit configured to set a storage destination for storing image data acquired by reading an image of a document by using a reading unit, an input unit configured to input first image data, which is acquired by reading an image of the document by using the reading unit, and second image data, which is acquired by reading an image of a document including a description of a processing instruction by using the reading unit, a determination unit configured to acquire processing instruction information by analyzing the second image data and to determine whether a description included in a processing target field included in the first image data is appropriate according to processing target field information and a processing code included in the acquired processing instruction information, a transmission unit configured, if it is determined by the determination unit that the description in the processing target field is appropriate, to transmit the first image data to the storage destination set by the storage destination setting unit, a generation unit configured, if it is determined by the determination unit that the description in the processing target field is not appropriate, to generate processing instruction information to be used in re-storage processing including the storage destination, and an output unit configured to output data including the processing instruction information generated by the generation unit to a printing unit.

According to another aspect of the present invention, in re-storing data generated by correcting data whose description in a processing target field has been determined abnormal, a user can easily re-store the data without having to execute complicated operations.

According to yet another aspect of the present invention, the present invention provides a new useful function.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A through 2C illustrate an example of a document to be processed according to an exemplary embodiment of the present invention.

FIG. 9 illustrates an example of an address entry screen.

FIGS. 10A through 10C illustrate an example of a scan ticket used for re-storage processing.

FIG. 11 is a flow chart illustrating an example of processing for checking a document by using a scan ticket according to a second exemplary embodiment of the present invention.

FIG. 13 illustrates an example of a screen for executing a setting of data to be included in a scan ticket.

FIG. 16 is a flow chart illustrating an example of processing for checking a document by using a scan ticket used for re-storage processing according to the first and the second exemplary embodiments of the present invention.

DESCRIPTION OF THE EMBODIMENTS

Various exemplary embodiments, features, and aspects of the invention will be described in detail below with reference to the drawings.

Figure 1:
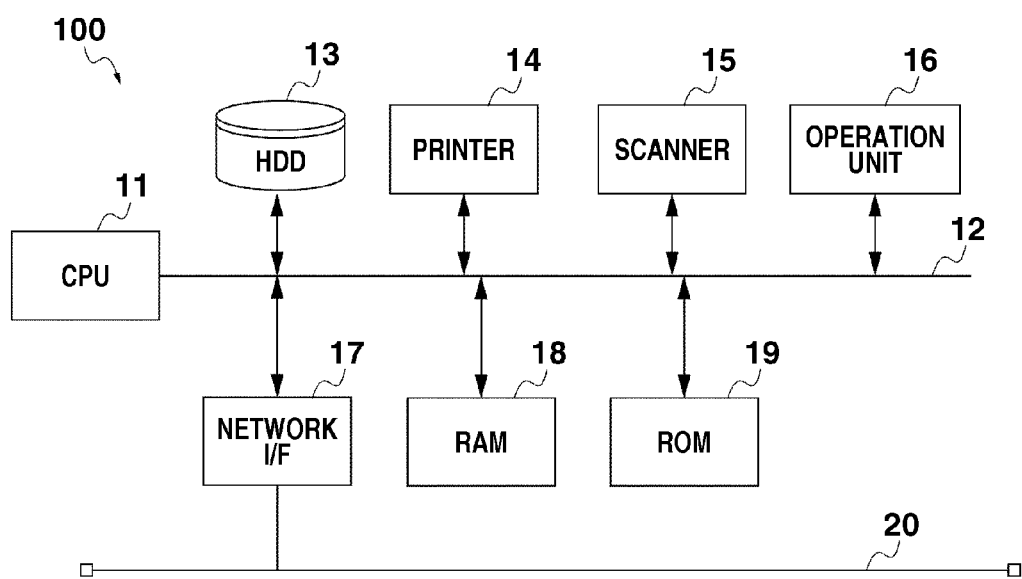
FIG. 1 illustrates an exemplary configuration of an image processing apparatus according to an exemplary embodiment of the present invention.

FIG. 1 illustrates an exemplary configuration of an image processing apparatus according to an exemplary embodiment of the present invention. Referring to FIG. 1, an image processing apparatus 100 according to a first exemplary embodiment is a multifunction peripheral (MFP) having various functions, such as a copy function and a scanner function. However, the functions can also be implemented by a plurality of apparatuses operating in conjunction with one another.

In the example illustrated in FIG. 1, a central processing unit (CPU) 11 controls an operation of the entire image processing apparatus 100 by loading and executing a program from a read-only memory (ROM) 19 onto a random access memory (RAM) 18. In addition, the CPU 11 communicates with each component of the image processing apparatus 100 via the bus 12.

An operation unit 16 includes a plurality of keys used by a user to give an instruction. Furthermore, the operation unit 16 includes a display unit that displays various information to be notified to the user. A scanner 15 reads an image of a document set by the user on a document positioning plate as a color image. In addition, the scanner 15 stores electronic data (image data) acquired by the reading of a hard disk drive (HDD) 13 and the RAM 18.

The HDD 13 is a hard disk drive including a hard disk. The HDD 13 stores various input information. Furthermore, the scanner 15 includes a document feeder and is capable of serially feeding a plurality of documents from the document feeder onto the document positioning plate to read an image thereof. A printer 14 prints an image, which is generated based on input image data, on a recording paper (sheet). A network I/F 17 is an interface for the image processing apparatus 100 to a network 20. Furthermore, the network I/F 17 controls reception of data from an external network apparatus and transmission of data to an external network apparatus.

In the present exemplary embodiment, image data to be used for the processing described below is input via the scanner 15. However, the same effect as that of the processing described below can be implemented by inputting image data of a document transmitted from an external apparatus via the network I/F 17. In addition, the same effect as that of the processing described below can be implemented by using a personal computer (PC) to which a scanner and a printer are connected. In this case, a part of or the entire program of a method according to the present exemplary embodiment can be provided to the PC via the network or via a storage medium, such as a compact disc-read only memory (CD-ROM), which stores the program.

Now, an example of a document used in the present exemplary embodiment will be described in detail below with reference to FIGS. 2A through 2C. FIG. 2A illustrates an example of a form of a document used in the present exemplary embodiment.

The document illustrated in FIG. 2A is an invoice including no description by the user (i.e., an invoice before processing instruction information, which will be described in detail below, is added thereto). The invoice includes fields for various contents, such as a customer corporation name, a person in charge of the customer, a subject, the total amount of money, an article name, a quantity, a unit, a unit price, an amount of money, a bank transfer account information, a subtotal, tax such as consumption tax, a description, or a seal of a publisher.

Before finally publishing the invoice, the user enters information to various fields, such as the subject field, the article name field, the quantity field, the unit field, the unit price field, the amount of money field, and the creator seal field. The present exemplary embodiment checks whether a specific field designated by the user, of the above-described fields of the invoice, includes information added by the user and whether a specific other field, of the above-described fields of the invoice, includes no information.

FIG. 2B illustrates an example of the document after the user has added information to an arbitrary field, which is a check target field, of the item fields included in the document illustrated in FIG. 2A, by using a color pen. The document illustrated in FIG. 2B becomes and is used as a processing instruction sheet. In the present exemplary embodiment, a processing instruction sheet is generated by the user who checks the generated invoice, by writing processing instruction information, which will be described in detail below, onto a sheet having the same format as the format of the check target invoice. To paraphrase this, the invoice illustrated in FIG. 2A including processing instruction information is used as the processing instruction sheet. In the present exemplary embodiment, in order to designate a field to be processed (a processing target field), the user surrounds the processing target field as a closed field having a rectangular shape, by using a color pen by hand.

Now, processing instruction information to be written in the invoice will be described in detail below. In the present exemplary embodiment, it is supposed, in the example illustrated in FIG. 2B, that the user has added information to a field 31 by using a blue pen, that information has been added to a field 32 by using a green pen, and that information has been added to a field 33 by using a red pen. However, a pen of any other color can be used. In addition, the number of colors of pens used in the present exemplary embodiment is not limited to three. In other words, the number of colors of the pens can be decreased or increased according to the contents to be checked. Furthermore, a tool other than a pen capable of marking the field with a color can be used instead of the above-described pen.

In addition, the user previously mutually associates information about the color and the content of processing included in processing instruction information to be used and registers the mutually associated information and processing content in the RAM 18 by using the operation unit 16. More specifically, the user previously associates the color of blue with processing for checking whether the field has been left blank.

Furthermore, the user associates the color of green with processing for checking whether information is described in the corresponding field. In addition, the user previously associates the color of red with processing for checking whether a seal or a signature has been provided. The user previously registers the above-described relationship between the color and the corresponding processing content in the RAM 18. The CPU 11 determines a color component (the hue, for example) of each color registered in the above-described manner and stores the corresponding processing content in the RAM 18.

The color can be registered by using the scanner 15 by reading the information written on the sheet instead of using the operation unit 16. In addition, the color can be previously registered in the image processing apparatus 100 instead of requiring the user to register the color. If the color and the corresponding processing content are previously registered in the image processing apparatus 100, the user adds processing instruction information to the document according to the registered color and the corresponding processing content.

As described above, the present exemplary embodiment registers the color component of the processing instruction information to be used and the corresponding processing content and generates a processing instruction sheet according to the registered processing content. In addition, the present exemplary embodiment extracts the processing instruction information and recognizes the processing content according to a result of the extraction. Accordingly, the image processing apparatus 100 checks whether the check target document includes information in its specific area, whether a specific area of the document has been left blank, and whether a specific area of the document includes a seal.

FIG. 2C illustrates an example of a check target document used in the present exemplary embodiment. In the present exemplary embodiment, it is supposed that a check target document is generated based on a document having the same format as that of the document illustrated in FIGS. 2A and 2B. More specifically, in the example illustrated in FIG. 2C, the processing instruction information added to the document as illustrated in FIG. 2B is extracted. Furthermore, if it is determined that no information is included in a field 41 (i.e., that the field 41 has been left blank), that a field 42 includes information, and that a field 43 includes a seal, then it is determined that the document has been normally produced.

The document illustrated in FIG. 2C satisfies all condition for checking whether the document has been normally produced. Accordingly, the document illustrated in FIG. 2C is determined to have been normally produced. If a document does not satisfy any document normality determination condition, the document is determined to be abnormal. The content of the checking and the field to be checked is not limited to those described above. In other words, any other different contents can be designated as contents of the checking. In addition, any other fields can be designated as check target fields.

Now, scan ticket generation processing, which is processing for checking the content of a description included in a document according to the processing instruction sheet (FIG. 2B), will be described in detail below. In the present exemplary embodiment, a "scan ticket" refers to a ticket having a format that enables the image processing apparatus 100 to recognize the content of the instruction illustrated in FIG. 2B and a method for checking a check target document. QR codes can be used as the above-described format of the ticket.

A scan ticket includes the content of the instruction recognized and extracted from the document illustrated in FIG. 2B and positional information about a field to which the content of the instruction is to be applied. In checking the check target document, at first, the scanner 15 reads the scan ticket. Then the CPU 11 recognizes the content of the instructed processing. The check target document is checked according to the recognized processing content.

Figure 3B:
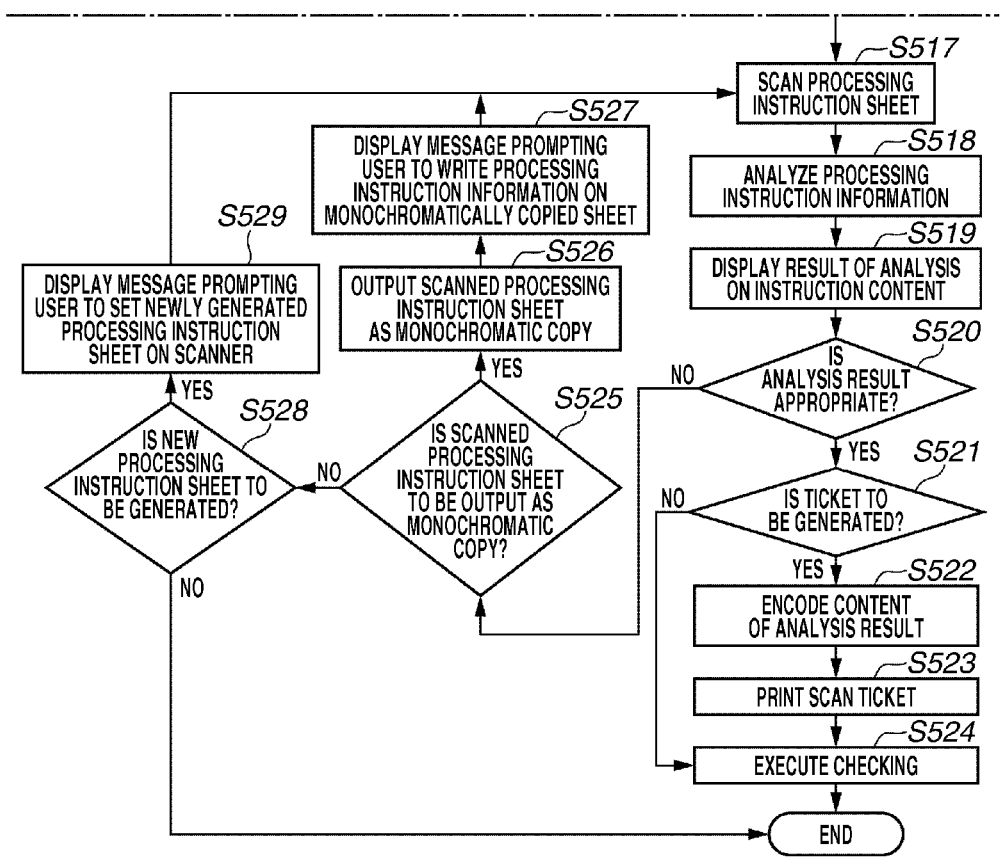
FIG. 3 is a flow chart illustrating an example of processing for generating a scan ticket according to an exemplary embodiment of the present invention.
Figure 4:
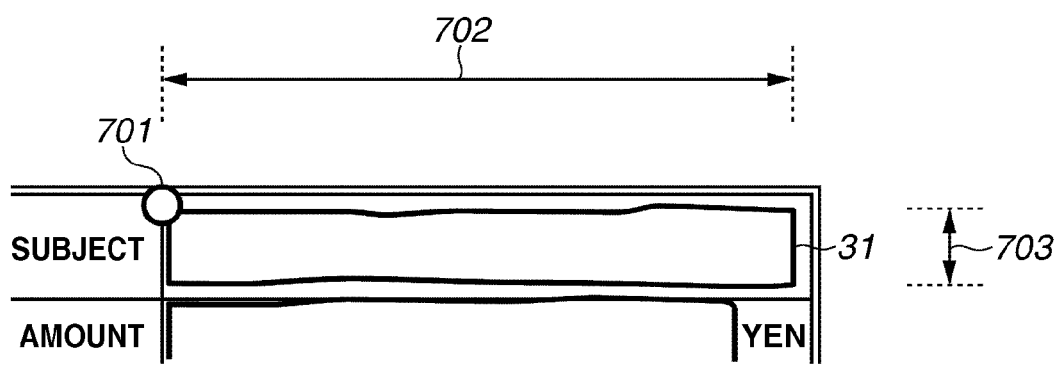
FIG. 4 is a magnified view of a part of a processing instruction sheet.
Figure 5:
FIG. 5 illustrates an example of a Quick Response (QR) Code®.

Scan ticket generation processing according to the present exemplary embodiment will be described in detail below with reference to FIG. 3. FIG. 3 is a flow chart illustrating an example of scan ticket generation processing according to the present exemplary embodiment. FIG. 4 is a magnified view of the processing instruction field 31. FIG. 5 illustrates an example of a QR code, which is generated by encoding processing instruction information.

FIG. 3 is a flow chart illustrating an exemplary flow of processing for generating a scan ticket according to the present exemplary embodiment. The processing in the flowchart of FIG. 3 is implemented by the CPU 11 by loading and executing, from the ROM 19 on the RAM 18, a program for executing each processing of the flow chart of FIG. 3. When the user gives an instruction for generating a scan ticket by operating the operation unit 16, the flow illustrated in FIG. 3 starts.

Referring to FIG. 3, in step S501, the CPU 11 displays, on the operation unit 16, a combination of an instructed color included in processing instruction information that has been registered in the RAM 18 (hereinafter the instructed color included in the processing instruction information is simply referred to as a "instructed color") and a content of the designated processing. More specifically, the CPU 11 displays a message, such as "if a seal and/or a signature is included in the field highlighted with a red mark, the document is determined normal", "if the field highlighted with a blue mark is left blank, the document is determined normal", or "if the field highlighted with a green mark includes a description, the document is determined normal" on the operation unit 16.

In step S502, the CPU 11 displays a message prompting the user to determine and confirm whether the instructed color and the processing content displayed in step S501 are appropriate. If it is determined that the user has done input via the operation unit 16 indicating that the instructed color and the processing content displayed in step S501 are not appropriate (No in step S502), then the processing advances to step S505. In step S505, the CPU 11 displays a message indicating that the combination of the instructed color and the processing content is to be changed, on the operation unit 16.

More specifically, in step S505, the CPU 11 can display a message that prompts the user to determine and input a color to be changed and can display a new color instead of the instructed color. Alternatively, the user can designate an arbitrary color by operating the operation unit 16. Further alternatively, the CPU 11 can merely change the combination of the color and the processing content instead of displaying a new color. The CPU 11 cannot give an instruction of different processing contents by the same color. Accordingly, the CPU 11 executes control so that one color corresponds to one processing content only.

After executing the processing in step S505 for changing either the instructed color or the processing content or both the instructed color and the processing content, the processing advances to step S501 and executes the above-described display. In this case, in step S501, the CPU 11 causes the user to verify that the changing processing has been executed in step S505.

On the other hand, if it is determined and confirmed by the user that the displayed instructed color and the processing content are appropriate (Yes in step S502), then the processing advances to step S503. In this case, the CPU 11 determines to use the instructed color and the corresponding processing content included in the processing instruction information. Furthermore, the CPU 11 registers the determined information in the RAM 18.

As described above, by executing the determination in step S502, the user is allowed to visually verify the content of the document (the color included in the document) and the CPU 11 determines that the color component of the instructed color and the color component of the color included in the document are different from each other if they are determined to be only similar to each other. Accordingly, the present exemplary embodiment can prevent an error in extracting processing instruction information.

If it is determined that the color component included in the document is similar to the color component of the instructed color (Yes in step S502), then the CPU 11 displays, on the operation unit 16, a message that prompts the user to set the document. Alternatively, it is also useful if the document is monochromatically copied if it is determined that the document has been set. If this configuration is employed, the present exemplary embodiment can prevent an error in extracting processing instruction information when the processing instruction information has been added by using a color pen. If it is determined that the instructed color and the processing content are appropriate (Yes in step S502), then the CPU 11 identifies and extracts the color component used in the processing instruction information and stores the extracted color component in the RAM 18.

In step S503, the CPU 11 displays a message, on the operation unit 16, which prompts the user to indicate whether the user has the check target document (FIG. 2C) only. More specifically, the message displayed in step S503 prompts the user to indicate whether the document that is used as the template in generating a processing instruction sheet (i.e., the document illustrated in FIG. 2A or 2B) exists. In other words, the display in step S503 is executed so that if the user has the check target document only, the user can generate a document in which the processing instruction information is to be written based on the check target document. In the present exemplary embodiment, a "template" refers to a form of a document, which is different from a check target document and to which the user can add processing instruction information.

If it is determined and input via the operation unit 16 that the user has the check target document only (i.e., that no document that can be used as the template exists) (Yes in step S503), then the processing advances to step S504. In step S504, the CPU 11 displays a message on the operation unit 16 that prompts the user to set the check target document on the scanner 15. More specifically, in this case, a guidance message "Please set one sheet of check target document. After setting the sheet, please press the "OK" button." is displayed. In addition, the OK button is displayed, which is used for recognizing that the document has been set.

In the present exemplary embodiment, the CPU 11 recognizes that the document has been set when the OK button is pressed. However, it can be automatically recognized that the document has been set on the scanner 15 by using a photo interrupter provided below the document positioning plate or a document sensor included in the document feeder.

If the OK button is pressed in step S504, then the processing advances to step S506. In step S506, the CPU 11 controls the scanner 15 to read an image of the check target document. In addition, the CPU 11 converts the image data input by the scanner 15 into monochromatic image data. Furthermore, the CPU 11 outputs the image data to the printer 14 to print and output the image data on a recording paper as a monochromatic copy.

In step S506, the read document is converted into monochromatic image data and printed by using the printer 14. However, the present exemplary embodiment is not limited to this. More specifically, the document can be printed by using the printer 14 after converting the color of the read document image into a different color that does not include the instructed color.

More specifically, the document can be output after converting the color of a red character of the read document image into a different color, such as blue. Further alternatively, it is also useful if a conversion target color is previously registered in the RAM 18 and the target color is converted if the same color as the registered target color exists in the read document image. In step S507, the CPU 11 displays a message, on the operation unit 16, which prompts the user to write the processing instruction information illustrated in FIG. 2B on the recording paper output by the printer 14 in step S506.

On the other hand, if it is determined and input by the user that the user has a template document (No in step S503), then the processing advances to step S508. In step S508, the CPU 11 displays a message, on the operation unit 16, which prompts the user to determine and confirm whether the processing instruction information has been already described in the template (FIG. 2B).

If it is determined and input by the user via the operation unit 16 that no processing instruction information has been described in the template (No in step S508), then the processing advances to step S509. In step S509, the CPU 11 displays a message, on the operation unit 16, which prompts the user to set the template on the scanner 15. More specifically, in step S509, a guidance message, such as "Please set the template on the scanner. After setting the template, please press the OK button", and the OK button are displayed. In the present exemplary embodiment, the CPU 11 recognizes that the document has been set when the OK button is pressed. However, it can be automatically recognized that the document has been set on the scanner 15 by using a photo interrupter provided below the document positioning plate or a document sensor included in the document feeder.

If the OK button is pressed in step S509, then the processing advances to step S510. In step S510, the CPU 11 executes control for reading an image of the template document by using the scanner 15. In step S511, the CPU 11 executes analysis and recognition processing for determining whether the image data acquired in the above-described manner includes a color component of the same color as the instructed color.

In the color component analysis and recognition processing, in a case of determining whether the color of red is included, the CPU 11 executes processing for extracting the hue of the color of red. For the color component analysis and recognition, various publicly known methods can be used. Furthermore, a parameter other than the hue can be used. Moreover, a combination of different parameters can be used.

In step S512, the CPU 11 determines whether the same color as the instructed color that has been registered in the RAM 18 is included in the color that has been subjected to the analysis and recognition in step S511. For the determination as to whether the instructed color and the color that has been subjected to the analysis and recognition in step S511, the colors can be determined to be the same if they completely match each other or if they match within a specific difference range.

More specifically, if a red (R), green (G), and blue (B) (RGB) value is presented in 256 levels, it is also useful if the RGB value of the color that has been analyzed and recognized in step S511 is compared with the RGB value of the instructed color. In this case, it can be determined that the analysis and recognition target color is the same as the instructed color if the difference between the RGB values is within the range of plus or minus 20 levels. A method different from that described above can be used in determining whether the analysis and recognition target color and the instructed color are the same.

If it is determined that the same color as the instructed color that has been registered in the RAM 18 is included in the image of the template (Yes in step S512), then the processing advances to step S513. In step S513, the CPU 11 displays a message, on the operation unit 16, which prompts the user to set the template on the scanner 15. More specifically, in step S513, a message, such as "Please set the template on the scanner. After setting the template, please press the OK button." and the OK button are displayed.

In the present exemplary embodiment, the CPU 11 recognizes that the document has been set when the OK button is pressed. However, it can be automatically recognized that the document has been set on the scanner 15 by using a photo interrupter provided below the document positioning plate or a document sensor included in the document feeder. If the OK button is pressed in step S513, then the processing advances to step S514. In step S514, the CPU 11 controls the scanner 15 to read an image of the check target document. In addition, the CPU 11 converts the image data input by the scanner 15 into monochromatic image data. Furthermore, the CPU 11 outputs the image data to the printer 14 to print and output the image data on a recording paper as a monochromatic copy.

In step S514, the read document is converted into monochromatic image data and printed by using the printer 14. However, the present exemplary embodiment is not limited to this. In other words, alternatively, the document can be printed by using various other methods as described above similar to the processing in step S506. In step S515, the CPU 11 displays a message, on the operation unit 16, which prompts the user to write the processing instruction information (FIG. 2B) on the recording paper output by the printer 14 in step S514.

On the other hand, if it is determined that the same color as the instructed color that has been registered in the RAM 18 is not included in the image of the template (No in step S512), then the processing advances to step S516. In step S516, the CPU 11 displays a message, on the operation unit 16, which prompts the user to write the processing instruction information (FIG. 2B) in the template document.

In step S508, in step S508, the CPU 11 displays a message, on the operation unit 16, which prompts the user to determine and confirm whether the processing instruction information has been already described in the template (FIG. 2B). If it is determined and confirmed by the user via the operation unit 16 that the processing instruction information has already been described in the template (Yes in step S508), then the processing advances to step S517. In step S517, the CPU 11 controls the scanner 15 to read an image of the document (template) including the processing instruction information. In step S517, the scanner 15 reads the image of the document by executing the same processing as that described above, which is executed in outputting the document image as a monochromatic copy.

More specifically, the CPU 11 executes control for displaying a message that prompts the user to set the document including the processing instruction information, on the operation unit 16. When the user sets the document and presses the OK button after that, the CPU 11 controls the scanner 15 to read an image of the document. However, in this case, the image data acquired by reading the image of the document by using the scanner 15 is not converted into monochromatic image data and is stored on the RAM 18 as it is.

In step S518, the CPU 11 analyzes and recognizes the processing instruction information based on the image data input by the scanner 15. More specifically, in step S518, the CPU 11 analyzes in which field of the document the instructed color determined in step S502 exists. Furthermore, for each color, the CPU 11 recognizes the color of the field to identify the location of the analysis and recognition target field.

Based on the location identified in step S518, a size of a processing target field and a field of the document where it exists can be determined. The location can be identified and expressed by coordinates.

FIG. 4 illustrates an example of the processing instruction field 31 (FIG. 2B) in which a checking person has written information by using a blue pen. In step S518 (FIG. 3), the processing instruction field 31 is recognized as a closed field. Furthermore, the CPU 11 extracts check target field information including start point coordinates 701. In the present exemplary embodiment, the coordinates of the upper-left edge of the field is used. In addition, the check target field information includes a width 702 and a height 703.

Let the location of the processing instruction field 31 has X, Y coordinates (Y, X). In this case, the processing instruction field 31 has the start point coordinates (1108, 963). In addition, the width 702 of the processing instruction field 31 has a value "834" and the height 703 of the processing instruction field 31 has a value "128".

Similarly, for the processing instruction field 32, in which the checking person has written information by using a green pen, the start point thereof has coordinates (1240, 963), the width 702 thereof has a value "740", and the height 703 thereof has a value "100". For the processing instruction field 33, in which the checking person has written information by using a red pen, the start point thereof has coordinates (2955, 2050), the width 702 thereof has a value "200", and the height 703 thereof has a value "171".

In addition, the CPU 11 executes the determination as to the instructed color for the processing instruction fields 31 through 33 and extracts a processing code therefrom. More specifically, the processing code for the processing instruction field 31, in which the information is written by using a blue pen, is "1". Similarly, the processing code for the processing instruction field 32, in which the information is written by using a green pen, is "0". Furthermore, the processing code for the processing instruction field 31, in which the information is written by using a red pen, is "2".

The CPU 11 associates the location identified in the above-described manner with the processing content determined in step S502. In addition, the CPU 11 stores the mutually associated location and the processing content on the RAM 18.

In step S519 (FIG. 3), the CPU 11 displays a result of the analysis and the recognition executed in step S518 on the operation unit 16. More specifically, in step S519, the CPU 11 displays, on the operation unit 16, the coordinates of the field corresponding to the identified processing instruction information and the content of the processing to be executed on the field.

Alternatively, the following configuration can be employed. More specifically, the CPU 11 executes control for displaying a thumbnail image of the read document image. In this case, by displaying the thumbnail image corresponding to the read document image, it becomes possible to identify the location of the field in which the processing instruction information is described and the content of the corresponding processing.

In step S520 (FIG. 3), the CPU 11 displays, on the operation unit 16, a message that prompts the user to verify whether the content of the display displayed in step S519 is appropriate. If it is determined and input by the user via the operation unit 16 that the content of the display displayed in step S519 is not appropriate (No in step S520), then the processing advances to step S525. In step S525 (FIG. 3), the CPU 11 displays, on the operation unit 16, a message that prompts the user to determine and confirm whether to output the image of the template read by the scanner 15 in step S517 by using the printer 14 as a monochromatic copy.

If the user inputs a positive instruction via the operation unit 16 (Yes in step S525), then the processing advances to step S526 (FIG. 3). In step S526, the CPU 11 converts the image of the document read by using the scanner 15 in step S517 into monochromatic image data and outputs the image data by using the printer 14 as a monochromatic copy.

To paraphrase this, if the processing instruction information has not been normally extracted, the CPU 11 executes control for monochromatically copying the processing instruction sheet to which the processing instruction information has been added. Furthermore, by using the above-described copy, the CPU 11 adds the processing instruction information to the template again.

In step S526, the CPU 11 generates a monochromatic copy of the document and prints the copy by using the printer 14. However, the present invention is not limited to this. In other words, alternatively, the document can be printed by using various other methods as described above similar to the processing in step S506.

In step S527, the CPU 11 displays a message, on the operation unit 16, which prompts the user to write the processing instruction information on the recording paper output by the printer 14 in step S526.

On the other hand, if it is determined and input by the user via the operation unit 16 that the document is not to be output as a monochromatic copy (No in step S525), then the processing advances to step S528 (FIG. 3). In step S528, the CPU 11 displays, on the operation unit 16, a message that prompts the user to determine and confirm whether to generate a new processing instruction sheet.

If it is instructed by the user via the operation unit 16 to generate a new processing instruction sheet (Yes in step S528), then the processing advances to step S529. In step S529, the CPU 11 displays, on the operation unit 16, a message that prompts the user to set the newly generated processing instruction sheet on the scanner. On the other hand, if it is instructed by the user via the operation unit 16 not to generate a new processing instruction sheet (No in step S528), then the processing ends.

After executing the display in step S527 or S529, if the user has set the document and pressed the OK button by operating the operation unit 16 to instruct reading of the document, the CPU 11 executes the processing in step S517 again. If it is input by the user via the operation unit 16 that the analysis result is appropriate (Yes in step S520), then the CPU 11 stores the content of the analysis on the RAM 18 as a result of extraction of the processing instruction information.

In step S521, the CPU 11 displays a message, on the operation unit 16, which prompts the user to determine and confirm whether to generate a scan ticket. If it is instructed by the user to generate a scan ticket via the operation unit 16 (Yes in step S521), then the processing advances to step S522. In step S522, the CPU 11 encodes the content of the analysis. More specifically, in encoding the content of the analysis, the CPU 11 encodes the result of the analysis displayed in step S519 by using a two-dimensional code, such as the QR code.

The content to be encoded includes the field that has been instructed to be processed and the content of the processing to be executed on the field. More specifically, in the case of the processing instruction sheet illustrated in FIG. 2C, the following text string is used, which includes the processing instruction information described in the processing instruction fields 31 through 33 in order of the X coordinate of the start point, the Y coordinate of the start point, the width of the field, the height of the field, and the processing code of the field by separating the same by a comma and FIG. 5 illustrates the QR code generated by encoding the text string "963, 1108, 834, 128, 1, 963, 1240, 740, 100, 0, 2050, 2955, 200, 171, 2".

In the present exemplary embodiment, a two-dimensional code is used in encoding the analysis result. However, the present exemplary embodiment is not limited to this. More specifically, a different method that can be appropriately used by the image processing apparatus 100 for the analysis and the recognition can be used for the encoding.

In step S523, the CPU 11 executes control for printing and outputting the coded data generated in step S522 on the recording paper by using the printer 14 as an image. By using the scan ticket printed in the above-described manner, the check target document can be checked. However, because it is indicated that the processing instruction sheet having been read by using the scanner 15 in step S517 has been appropriately recognized if it is determined and input by the user in step S520 that the analysis result is appropriate, the processing instruction sheet can be used as the scan ticket without executing the processing in steps S521 through 523. In this case, the CPU 11 can recognize the processing content from the processing instruction sheet in checking the document.

If the user has input a negative instruction for the message displayed in step S521 via the operation unit 16 (No in step S521), then the CPU 11 displays an identification (ID) for identifying the content of the analysis registered in step S520 on the operation unit 16. The ID is displayed to identify the analysis content and read and utilize the same from the RAM 18, in checking the check target document. Alternatively, the user can designate a desired ID via the operation unit 16 instead of displaying the ID under control of the CPU 11. The ID determined in the above-described manner and the analysis content are associated with each other and the mutually associated ID and the analysis content are stored on the RAM 18. Then, the processing advances to step S524.

In step S524, the CPU 11 checks the check target document according to the processing instruction information and the corresponding processing content recognized in the above-described manner. By executing the above-described processing, the present exemplary embodiment can print the document, whose color component has been converted into a color component different from the color component of the instructed color and to which the user adds the processing instruction information.

Accordingly, the apparatus according to the present exemplary embodiment can appropriately and normally recognize the processing instruction information added to the processing instruction sheet. In other words, the present exemplary embodiment is capable of preventing or at least reducing errors in recognizing processing instruction information.

In addition, the present exemplary embodiment is capable of appropriately notify the user of the necessary operation by displaying a notification message that prompts the user to issue an instruction whether to output the read document image as a monochromatic copy. Accordingly, the present exemplary embodiment can prevent or at least reduce an error by the user in instructing and executing the processing.

It is not necessary to execute the entire processing in the flow chart described above. In other words, it is also useful if only a part of the above-described processing is executed.

Figure 6:
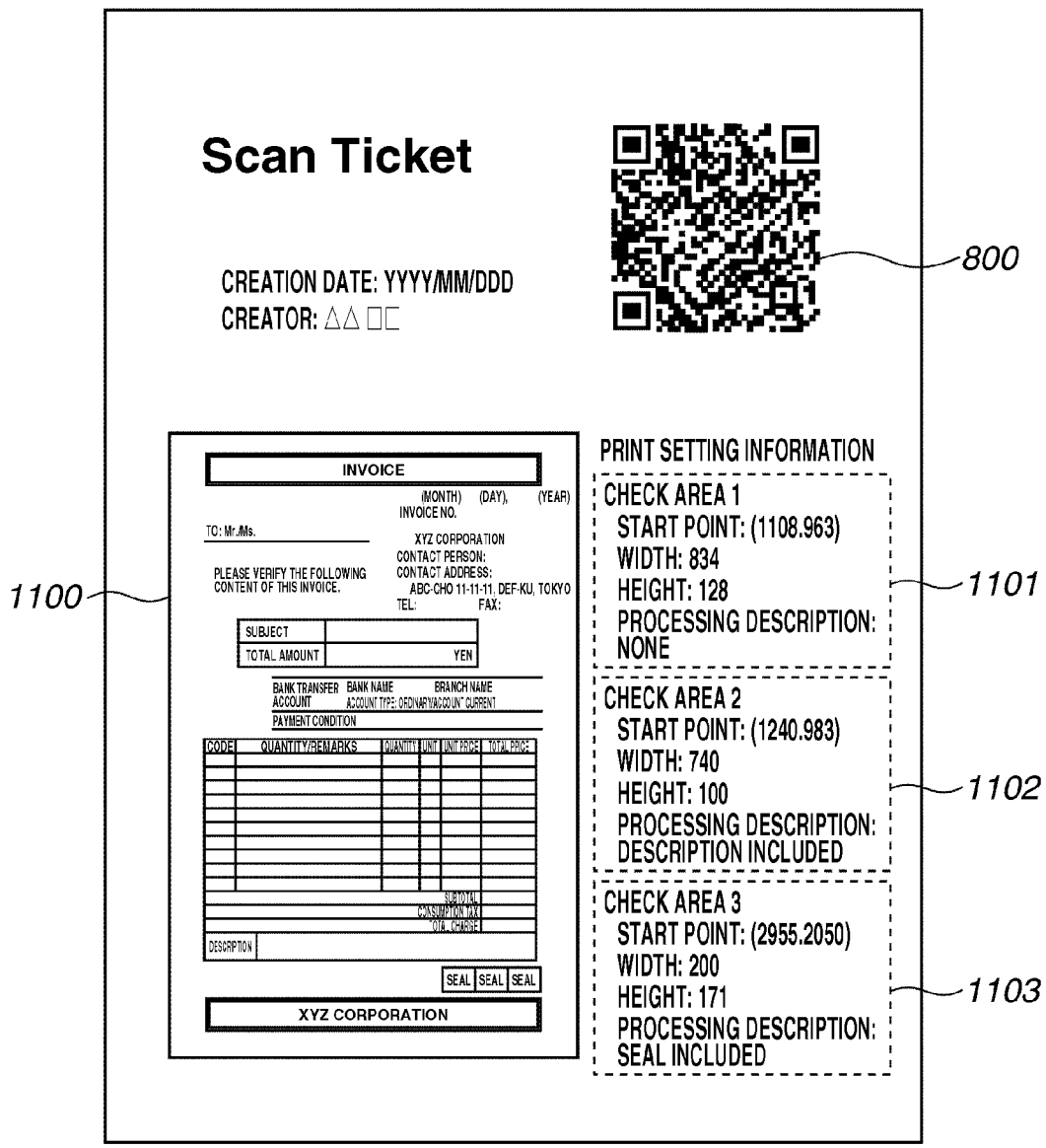
FIG. 6 illustrates an example of a scan ticket.

Now, an exemplary scan ticket, which is generated by the scan ticket generation processing in step S523, will be described in detail below with reference to FIG. 6. FIG. 6 illustrates an example of a scan ticket, which is generated based on the processing instruction sheet illustrated in FIG. 2B according to the present exemplary embodiment.

Referring to FIG. 6, a scan ticket includes a QR code 800, which is generated by encoding processing instruction information, a thumbnail image 1100, and processing instruction information 1101 through 1103. The processing instruction information 1101 includes text strings that describe the check target field information acquired from the processing instruction field 31 (FIG. 2B) (i.e., the coordinates of the start point, the width, and the height of the check target field) and a processing method corresponding to the processing code.

In addition, the processing instruction information 1102 includes text strings that describe the check target field information acquired from the processing instruction field 32 and a processing method corresponding to the processing code. Furthermore, the processing instruction information 1103 includes text strings that describe the check target field information acquired from the processing instruction field 33 and a processing method corresponding to the processing code.

The thumbnail image 1100 is generated by executing thumbnail image generation processing based on the processing instruction sheet (FIG. 2B). More specifically, the thumbnail image 1100 is generated by deleting the rectangle described by the checking person on the processing instruction sheet to instruct the processing and by reducing the image data including the rectangle in the instructed color according to the processing instruction information, to be used for a scan ticket.

Figure 7:
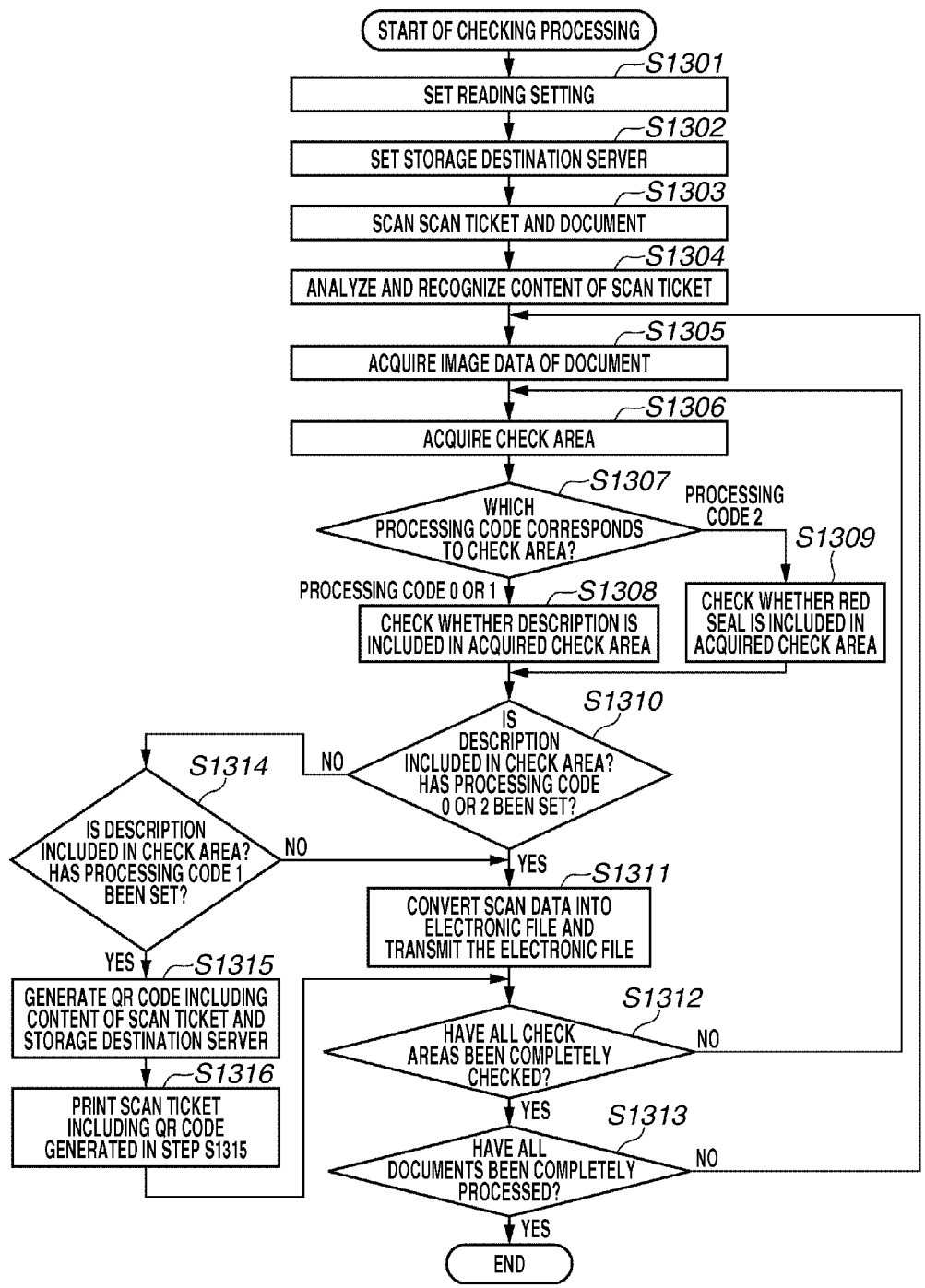
FIG. 7 is a flow chart illustrating an example of processing for checking a document by using a scan ticket according to a first exemplary embodiment of the present invention.

Now, processing for checking a document according to extracted processing instruction information by using a scan ticket generated by executing the processing in the flow chart of FIG. 3 will be described in detail below with reference to FIG. 7. FIG. 7 is a flow chart illustrating an example of processing for checking a document by using a scan ticket according to the present exemplary embodiment. The processing in the flow chart of FIG. 7 is implemented by the CPU 11 by loading and executing, from the ROM 19 on the RAM 18, a program for executing each processing of the flow chart of FIG. 7.

Figure 8:
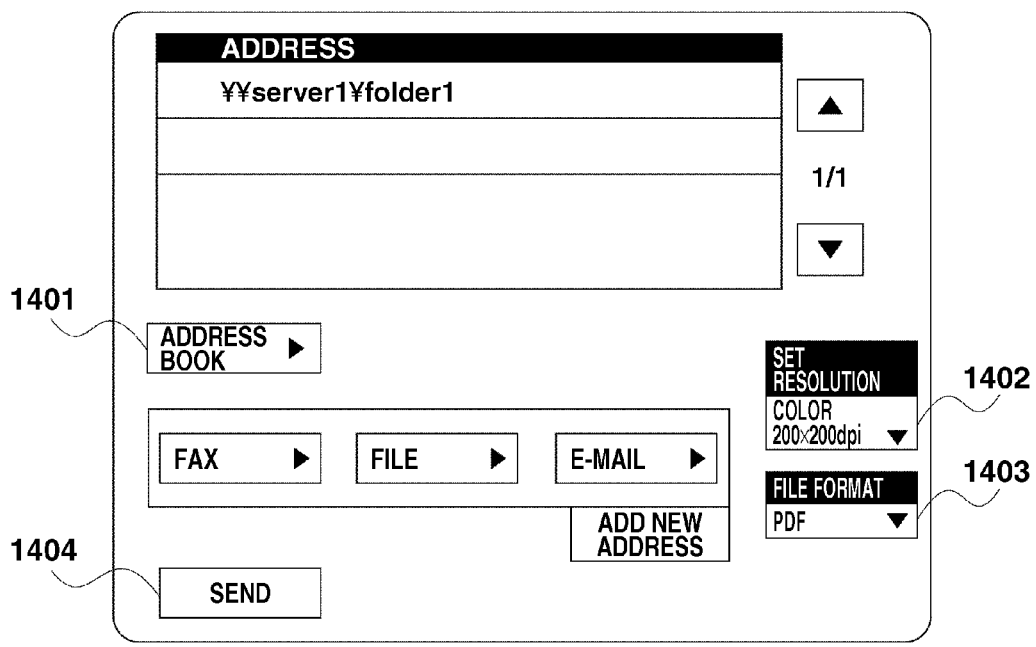
FIG. 8 illustrates an example of a transmission setting screen.

Referring to FIG. 7, in step S1301, the CPU 11 displays a setting screen illustrated in FIG. 8 on the operation unit 16. The user sets a reading resolution used in reading the check target document by using the scanner 15 in a resolution setting field 1402. In addition, the user sets a format of a file to be stored as a file of the read check target document via a file format setting field 1403.

In the present exemplary embodiment, the reading resolution and the file format are set as the reading setting. However, a setting other than those described above can be made as the reading setting. The CPU 11 displays the set reading resolution and the file format set according to the user instruction on the operation unit 16.

In step S1302, when the user selects an address book button 1401 displayed on the operation unit 16, the CPU 11 displays an address entry screen illustrated in FIG. 9. The user, via the address entry screen illustrated in FIG. 9, enters information about the server, which is a destination for storing a read document image. The information about the server includes a host name, a path to the folder, the name of the user who has executed the processing for reading the document, and a password. Furthermore, the CPU 11 displays the information about the server input by the user on the operation unit 16.

In step S1303, when the user sets the scan ticket and the check target document on the scanner 15, which serves as a reading unit, and presses a "transmit" button 1404, the CPU 11 controls the scanner 15 to start scanning. More specifically, the CPU 11 transmits an instruction to the scanner 15 for executing scanning according to the reading setting set in step S1301. When the scanner 15 receives the instruction, the scanner 15 starts the scanning of the scan ticket and the check target document. In step S1303, the scanning is started when the transmission button 1404 is pressed. However, the scanning can also be started when a scan button (not illustrated) is pressed.

After the scan ticket and the check target document are scanned, image data of the scan ticket including the processing instruction (second image data) and image data of the check target document (first image data) is temporarily stored on the HDD 13. In the present exemplary embodiment, for easier understanding, only a case is described where the check target document illustrated in FIG. 2C exists. However, the present exemplary embodiment can be applied to a case where a plurality of check target documents exists.

In step S1304, the CPU 11 executes control for reading the image data of the scan ticket from the HDD 13 and analyzes the scan ticket. A plurality of pieces of the processing instruction information is encoded into a QR code and printed on the scan ticket. Each processing instruction information includes processing target field information, which describes a check target field, and a processing code, which describes a method for processing the check target field.

The CPU 11 detects the location of the image data included in the QR code of the scan ticket. In addition, the CPU 11 decodes the QR code and acquires the plurality of pieces of the processing instruction information. The checking target field information included in the processing instruction information according to the present exemplary embodiment is expressed by coordinates on the image data. More specifically, the check target field information includes X, Y coordinates of the start point of the processing target field and the width and the height from the start point. In addition, the processing code describes the method for processing the check target field. More specifically, the processing code is expressed by a number corresponding to a method of processing to be executed on the check target field.

In the present exemplary embodiment, three processing methods are associated with the processing codes. More specifically, a processing code "0" corresponds to checking whether a description is included in the check target field. A processing code "1" corresponds to checking whether the check target field has been left blank. A processing code "2" is associated with checking whether the check target field includes a read seal.

If a plurality of check target documents has been read in step S1303, the processing instruction information described in the scan ticket which was scanned first is applied to all the plurality of check target documents to be scanned second and beyond. In this case, the processing instruction information read and acquired from the first scan ticket remains effective until all the check target documents are completely checked.

In step S1305, the CPU 11 serially reads image data of the documents to be checked from the HDD 13. In step S1306, the CPU 11 serially acquires check target fields based on the start point, the width, and the height included in the check target field information of the processing instruction information, from the image data read in step S1305.

In step S1307, the CPU 11 acquires the processing code corresponding to the check target field from the processing instruction information acquired in step S1306. If the processing code "0" or "1" is acquired (processing code "0" or "1" in step S1307), then the processing advances to step S1308. On the other hand, if it is determined that the processing code "2" is acquired (processing code "2" in step S1307), then the processing advances to step S1309.

In step S1308, the CPU 11 checks whether a description exists in the acquired check target field. More specifically, in the present exemplary embodiment, the CPU 11 executes control for converting the image data included in the check target field, which has been acquired in step S1306, into hue, luminance, saturation (HLS) color space. The CPU 11 can determine whether a description exists in the check target field based on a ratio of the number of pixels whose luminance L is lower than a predetermined level, to all the pixels existing within the check target field.

In the present exemplary embodiment, the image data of the check target field acquired from the image data of the document is RGB color space image data. In the present exemplary embodiment, the CPU 11 calculates the ratio of the number of pixels whose value of the luminance L is less than 50%, to all the pixels existing within the check target field. If the calculated ratio of the pixel is equal to or greater than 10%, the CPU 11 determines that the check target field includes a description.

However, the present exemplary embodiment is not limited to the above-described method. More specifically, a different method for determining whether a description is included in the check target field can be used. For example, whether a description is included in the check target field can be determined based on the total dimension of serially and continuously arranged low-luminance pixels existing in the main scanning direction. The above-described conversion from RGB color space image data to HLS color space image data can be executed by using various publicly known methods. Accordingly, detailed descriptions thereof will be omitted.

In step S1309, the CPU 11 checks whether a red seal exists in the acquired check target field. More specifically, in the present exemplary embodiment, the CPU 11 converts the color space of the image data of the check target field into the HLS color space in the manner similar to the method in step S1308. Furthermore, whether a red seal exists in the check target field can be determined based on a ratio of the number of pixels whose saturation S and hue H fall within a predetermined range, to all the pixels existing within the check (processing) target field.

To paraphrase this, in the present exemplary embodiment, the CPU 11 calculates the ratio of the number of pixels having 20% or higher saturation S, and 30 degrees or smaller, or 330 degrees or higher hue H, to all the pixels existing within the check target field. If the calculated ratio is 10% or higher, then the CPU 11 determines that a red seal is included in the check target field.

However, the present exemplary embodiment is not limited to the above-described method. More specifically, a different method for determining whether a description is included in the check target field can be used. For example, whether a description (i.e., a red seal) is included in the check target field can be determined based on the total dimension of serially and continuously arranged pixels having the saturation S and the hue H within a predetermined range and existing in the main scanning direction.

In step S1310, the CPU 11 determines whether a description is included in the check target field (processing target field) and whether the processing code for the check target field is "0" (the processing code "0" indicates that a description is included in the check target field) or "2" (the processing code "2" indicates that a red seal is included in the check target field) according to a result of the processing in step S1308 or S1309. If it is determined that a description exists in the check target field and the processing code "0" or "2" has been set for the check target field (Yes in step S1310), then the processing advances to step S1311. On the other hand, if the above-described condition is not satisfied (No in step S1310), then the processing advances to step S1314.

In other words, in step S1310, the present exemplary embodiment determines the normality of the description in the processing target field based on the processing code for the check target field (processing target field) and the presence or absence of a description within the processing target field. More specifically, if the processing code for the check target field is "0" (i.e., if a processing code indicating that a description exists in the check target field has been set for the check target field) and thus if a description is determined to exist within the processing target field, then the CPU 11 determines that the description in the processing target field is normal.

On the other hand, if the processing code for the check target field is "0" (i.e., if a processing code indicating that a description exists in the check target field has been set for the check target field) but if no description exists within the processing target field, then the CPU 11 determines that the description in the processing target field is not normal. If it is determined that the description in the processing target field is normal (Yes in step S1310), then the processing advances to step S1311. On the other hand, if it is determined that the description in the processing target field is not normal (No in step S1310), then the processing advances to step S1314.

In step S1314, the CPU 11 determines whether the check target field includes no description if the processing code "1" has been set for the check target field based on the result of the processing in step S1308 or S139. If the above-described condition is satisfied (Yes in step S1314), then the processing advances to step S1311. On the other hand, if it is determined that the above-described condition is not satisfied (No in step S1314), then the processing advances to step S1315.

In other words, in step S1314, the present exemplary embodiment determines whether a normal description is included in the processing target field according to the processing code for the check target field (processing target field) and the presence or absence of a description in the processing target field. More specifically, if the processing code "1" (the processing code "1" indicates that the check target field includes no description) and if the processing target field actually includes no description, then the CPU 11 determines that the description in the processing target field is normal.

On the other hand, if the processing code "1" (the processing code "1" indicates that the check target field includes no description) and if the processing target field actually includes a description, then the CPU 11 determines that the description in the processing target field is not normal. If the processing target field includes a normal description (Yes in step S1314), then the processing advances to step S1311. On the other hand, if the processing target field does not include a normal description (No in step S1314), then the processing advances to step S1315.

In step S1311, the CPU 11 reads image data of the check target document whose checking result is positive from the HDD 13. In addition, the CPU 11 converts the format of the image data into the file format set in step S1301 (i.e., portable document format (PDF)). Furthermore, the CPU 11 transmits the converted image data to the storage destination set in step S1302 via the network I/F 17.

In the present exemplary embodiment, when it is checked whether a description is included in the check target field (i.e., if the processing code "0" has been set) and if it is determined that a description is included in the check target field, then the result of the determination is positive. Furthermore, when it is checked whether the check target field includes no description (i.e., if the processing code "1" has been set) and if the check target field has been determined to include no description, then the result of the determination is also positive. In addition, when it is checked whether the check target field includes a red seal (i.e., if the processing code "2" has been set) and if the check target field has been determined to include a red seal, then the result of the determination is also positive.

On the other hand, in the present exemplary embodiment, when it is checked whether a description is included in the check target field (i.e., if the processing code "0" has been set) and if it is determined that no description is actually included in the check target field, then the result of the determination is negative. Furthermore, when it is checked whether the check target field includes no description (i.e., if the processing code "1" has been set) and if the check target field has been determined to actually include a description, then the result of the determination is also negative. In addition, when it is checked whether the check target field includes a red seal (i.e., if the processing code "2" has been set) and if the check target field has been determined not to actually include a red seal, then the result of the determination is also negative.

In the present exemplary embodiment, the converted image data is transmitted to the storage destination folder on the network via the network I/F 17. However, the present exemplary embodiment is not limited to this. More specifically, the converted image data can be stored on the HDD 13 instead of storing the same on a network folder.

In step S1315, the CPU 11 re-generates a QR code (processing instruction information) to be used in re-storing the document based on the processing instruction information acquired by decoding the QR code 800 illustrated in FIG. 6 and the information about the storage destination set in step S1302. The storage destination information set in step S1302 includes the host name (FIG. 9), the path to the folder (FIG. 9), the user name (FIG. 9), and the password (FIG. 9).

In the present exemplary embodiment, to "re-store" the document refers to processing executed when a document whose result of checking is negative is corrected and read, checked, and stored again. The QR code used in re-storing the document, which is generated in step S1315, includes the processing instruction information acquired in step S1304 and the storage destination information set in step S1302.

Figure 10A:
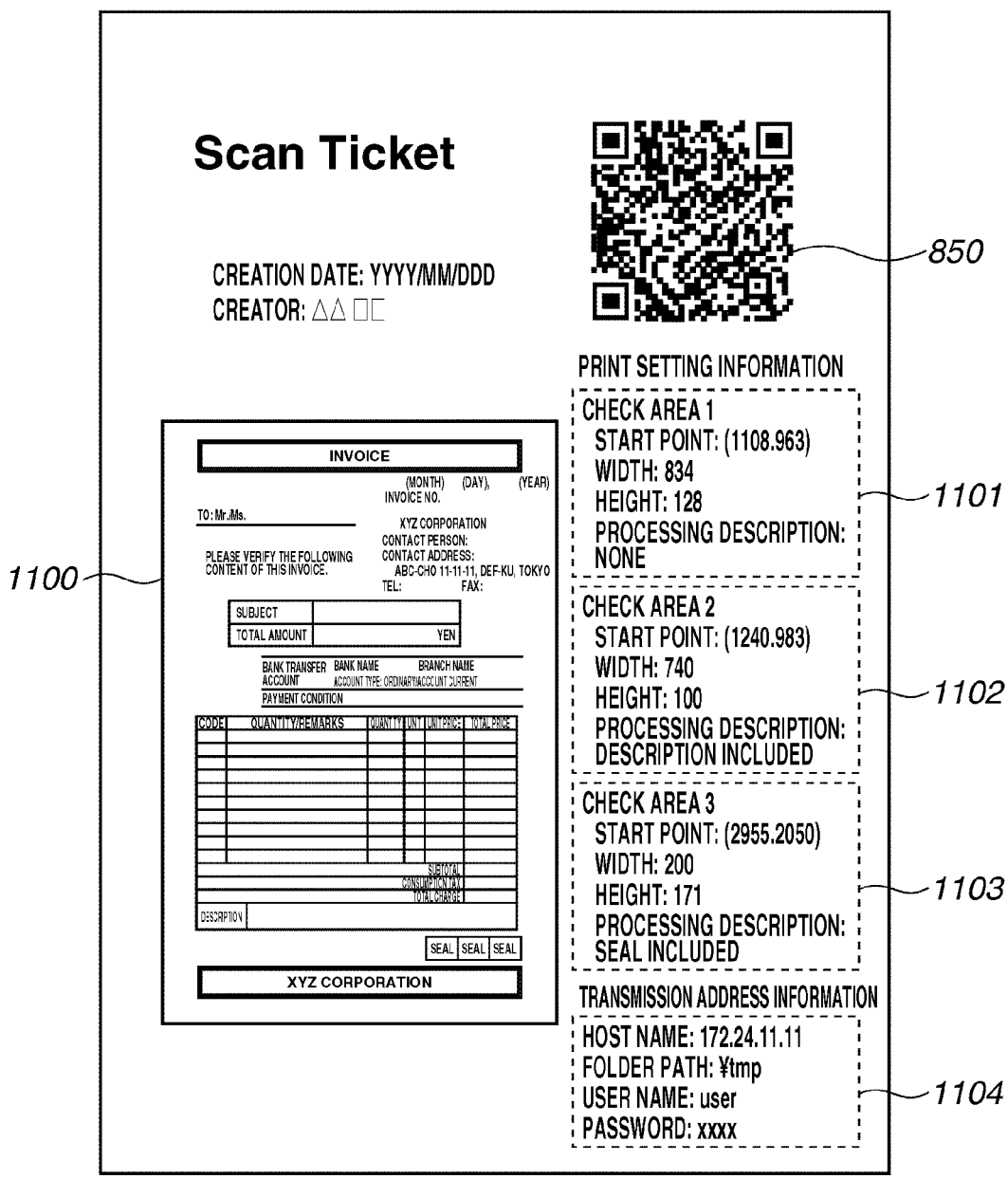

In step S1316, the CPU 11 uses the QR code generated in step S1315 to generate image data of the scan ticket to be used for re-storing the corrected document (FIG. 10A). In addition, the CPU 11 outputs the generated image data to the printer 14, which serves as a printing unit of the present invention, and prints the scan ticket to be used for re-storing the corrected document (FIG. 10A).

In the scan ticket to be used for re-storing the corrected document, the storage destination information set in step S1302, as well as the processing instruction information described in the original scan ticket (FIG. 6), is included in a QR code 850. In addition, transmission destination information (storage destination information) 1104 is included in the scan ticket to be used for re-storing the corrected document so that the storage destination can also be visually recognized.

In step S1312, the CPU 11 determines whether all the pieces of processing instruction information have been completely checked for the image data read in step S1305. If it is determined that all the pieces of processing instruction information have been completely checked for the image data read in step S1305 (Yes in step S1312), then the processing advances to step S1313. On the other hand, if it is determined that all the pieces of processing instruction information have not been completely checked yet for the image data read in step S1305 (No in step S1312), then the processing advances to step S1306.

In step S1313, the CPU 11 determines whether all the check target documents read in step S1303 have been completely processed. If it is determined that all the check target documents read in step S1303 have been completely processed (Yes in step S1313), then the processing ends. On the other hand, if it is determined that all the check target documents read in step S1303 have not been completely processed (No in step S1313), then the processing advances to step S1305.

In the present exemplary embodiment, if the checking result of the check target document is negative, a scan ticket used for re-storing the corrected document and including the storage destination information in its processing instruction information can be generated.

FIG. 16 is a flow chart illustrating an example of processing for checking a document by using a scan ticket used for corrected document re-storage processing according to the present exemplary embodiment. The processing in the flowchart of FIG. 16 is implemented by the CPU 11 by loading and executing, from the ROM 19 on the RAM 18, a program for executing each processing of the flow chart of FIG. 16.

Referring to FIG. 16, processing in step S1301, steps S1304 through S1310, and steps S1312 through S1314 is similar to the processing in step S1301, steps S1304 through S1310, and steps S1312 through S1314 illustrated in FIG. 7, respectively. However, processing in step S2001 in FIG. 16 differs from the processing in step S1303 illustrated in FIG. 7. Furthermore, processing in step S2002 in FIG. 16 differs from the processing in step S1311 illustrated in FIG. 7.

To begin with, processing in step S2001 will be described in detail below. In step S2001, the CPU 11 executes control for scanning the scan ticket to be used in corrected document re-storage processing, which includes the QR code generated in step S1315 (FIG. 7) and the document generated by correcting the document whose result of determination in step S1310 is "No" or the document generated by correcting the document whose result of determination in step S1314 is "No".

In the present exemplary embodiment, the "document whose result of determination in step S1310 is "No"" refers to the document whose result of checking in step S1308 or S1309 is negative. In addition, the "corrected document" refers to the document generated by correcting the document whose result of checking in step S1308 or S1309 is negative.

Now, processing in step S2002 will be described in detail below. In step S2002, the CPU 11 transmits scan data that has already been checked, to the storage destination included in the QR code generated in step S1315 (FIG. 7) (i.e., the storage destination set in step S1302 (FIG. 7)). Accordingly, the document generated by correcting the document whose result of the first checking processing is negative can be stored in the same storage destination as the storage destination of the document whose result of checking in the first checking processing is positive.

With the above-described configuration, the present exemplary embodiment enables the user to easily store the document generated by correcting the document whose result of checking by the first checking is negative, in the same storage destination as the storage destination of the document whose result of the first checking is positive. The user can easily store the document generated by correcting the document without storing the storage destination of the document whose result of the first checking is positive.

According to the present exemplary embodiment, as described above, a scan ticket for re-storage processing, which includes information about the storage destination in which the document has been stored by the previous storage operation, is used. Therefore, according to the present exemplary embodiment having the above-described configuration, when the document whose result of the first checking is negative is checked again after correcting the same, the user can easily store the corrected document in the same location at which the document has been stored previously without having to input the storage destination again. Accordingly, the present exemplary embodiment can improve the operability of the user.

Now, a second exemplary embodiment of the present invention will be described in detail below. In the present exemplary embodiment, in generating a scan ticket to be used in corrected document re-storage processing, the reading setting used in reading the check target document is included in the QR code of the scan ticket as well as the storage destination for storing the image data described above in the first exemplary embodiment. In the present exemplary embodiment, processing, units, components, and configurations similar to those of the first exemplary embodiment are provided with the same reference numerals, symbols, and step numbers. Accordingly, the detailed description thereof will not be repeated here and only difference points will be described in detail.

FIG. 11 is a flow chart illustrating an example of processing for printing a scan ticket to be used in corrected document re-storage processing according to the present exemplary embodiment. The processing in the flowchart of FIG. 11 is implemented by the CPU 11 by loading and executing, from the ROM 19 on the RAM 18, a program for executing each processing of the flow chart of FIG. 11.

Referring to FIG. 11, processing in steps S1301 through S1314 and step S1316 is similar to the processing in steps S1301 through S1314 and step S1316 illustrated in FIG. 7. On the other hand, processing in step S1501 is different from the processing in step S1315 illustrated in FIG. 7. If the result of the checking in step S1314 is negative, then the processing advances to step S1501.

In step S1501, the CPU 11 regenerates the QR code to be used in corrected document re-storage processing based on the processing instruction information generated based on decoded QR code 800 of the scan ticket (FIG. 6), the reading setting information set in step S1301, and the storage destination information set in step S1302.

In the present exemplary embodiment, the processing instruction information includes check target field information, which describes the check target field, and the processing code, which indicates the method of processing to be executed on the check target field. The reading setting information is information about the reading resolution and the file format set in step S1301. Furthermore, the storage destination information includes the host name, the path to the folder, the user name, and the password illustrated in FIG. 9.

Figure 10B:
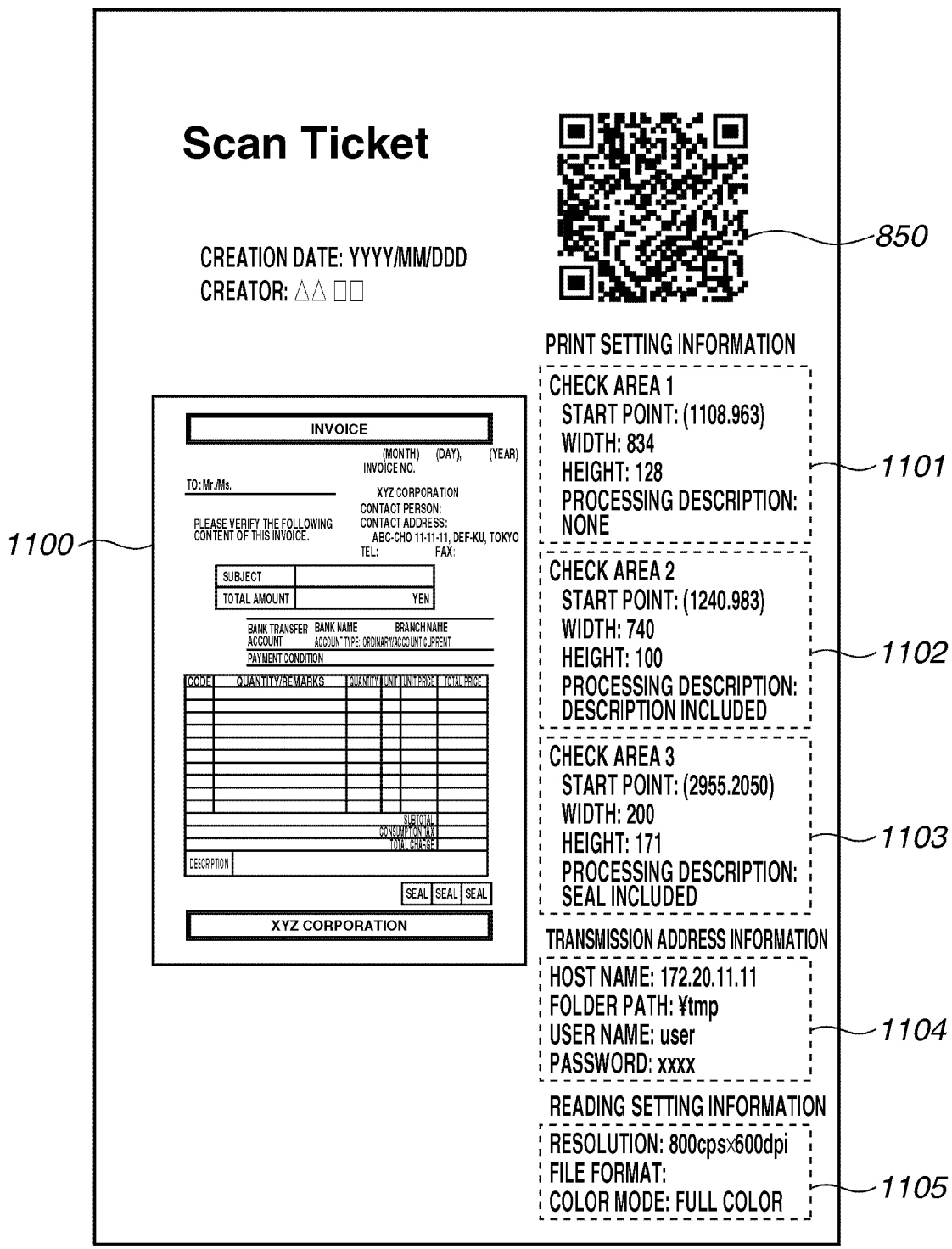

In step S1316, the CPU 11 generates the image data of the scan ticket used for corrected document re-storage processing (FIG. 10B) by using the QR code generated in step S1501 and transmits the generated image data to the printer 14. Then, the scan ticket to be used in corrected document re-storage processing (FIG. 10B) is printed by the printer 14.

The scan ticket to be used in corrected document re-storage processing (FIG. 10B) includes the reading setting information (the reading resolution and the file format) set in step S1301 and the storage destination information set in step S1302 as well as the processing instruction information described in the original scan ticket (FIG. 6). In addition, the storage destination information 1104 and the reading setting information 1105 is described in the scan ticket to be used for re-storing the corrected document so that the storage destination and the reading setting information can also be visually recognized.

In the present exemplary embodiment, the reading resolution and the file format are used as the reading setting information. However, all of or apart of reading settings that can be set in executing scanning, i.e., a setting, such as a reading density and/or a reading magnification, can be used as the reading setting information.

Now, an exemplary flow of processing according to the present exemplary embodiment for checking the document by using the scan ticket to be used in corrected document re-storage processing will be described in detail below with reference to FIG. 16. In the present exemplary embodiment, processing in steps S2001, step S2002, steps S1304 through S1310, and steps S1312 through S1314 is similar to the processing described above in the first exemplary embodiment with reference to FIG. 16. Processing in step S1301 differs from the processing in step S1301 in the flow chart of FIG. 16 described above in the first exemplary embodiment. In the present exemplary embodiment, in step S1301, a reading setting included in the QR code of the scan ticket used for corrected document re-storage processing is made.

According to the present exemplary embodiment, as described above, a scan ticket to be used in corrected document re-storage processing, which includes information about the storage destination which stores the document in the previous storage operation, is used. Therefore, according to the present exemplary embodiment having the above-described configuration, when the document whose result of the first checking is negative is checked again after correcting the same, the user can easily store the corrected document in the same location at which the document before correction has been stored by the previous storage operation without inputting the storage destination again. Accordingly, the present exemplary embodiment can improve the operability of the user.

In addition, in the present exemplary embodiment, the reading setting information used in previous scanning of the check target document is also included in the scan ticket to be used in corrected document re-storage processing. Therefore, the present exemplary embodiment enables the user to easily scan the check target document according to the scan setting made in the previous scanning operation without resetting the reading setting made in the previous scanning operation. Accordingly, the present exemplary embodiment can improve the operability of the user.

A third exemplary embodiment of the present invention differs from the first and the second exemplary embodiment in the following point. More specifically, in the present exemplary embodiment, the user can select setting information to be included in the scan ticket to be used in corrected document re-storage processing. The other configuration of the present exemplary embodiment is similar to that of the first and the second exemplary embodiments. Furthermore, in the present exemplary embodiment, units, components, and configurations similar to those of the first exemplary embodiment are provided with the same reference numerals, symbols, and step numbers. Accordingly, the detailed description thereof will not be repeated here and difference points only will be described in detail.

Figure 12:
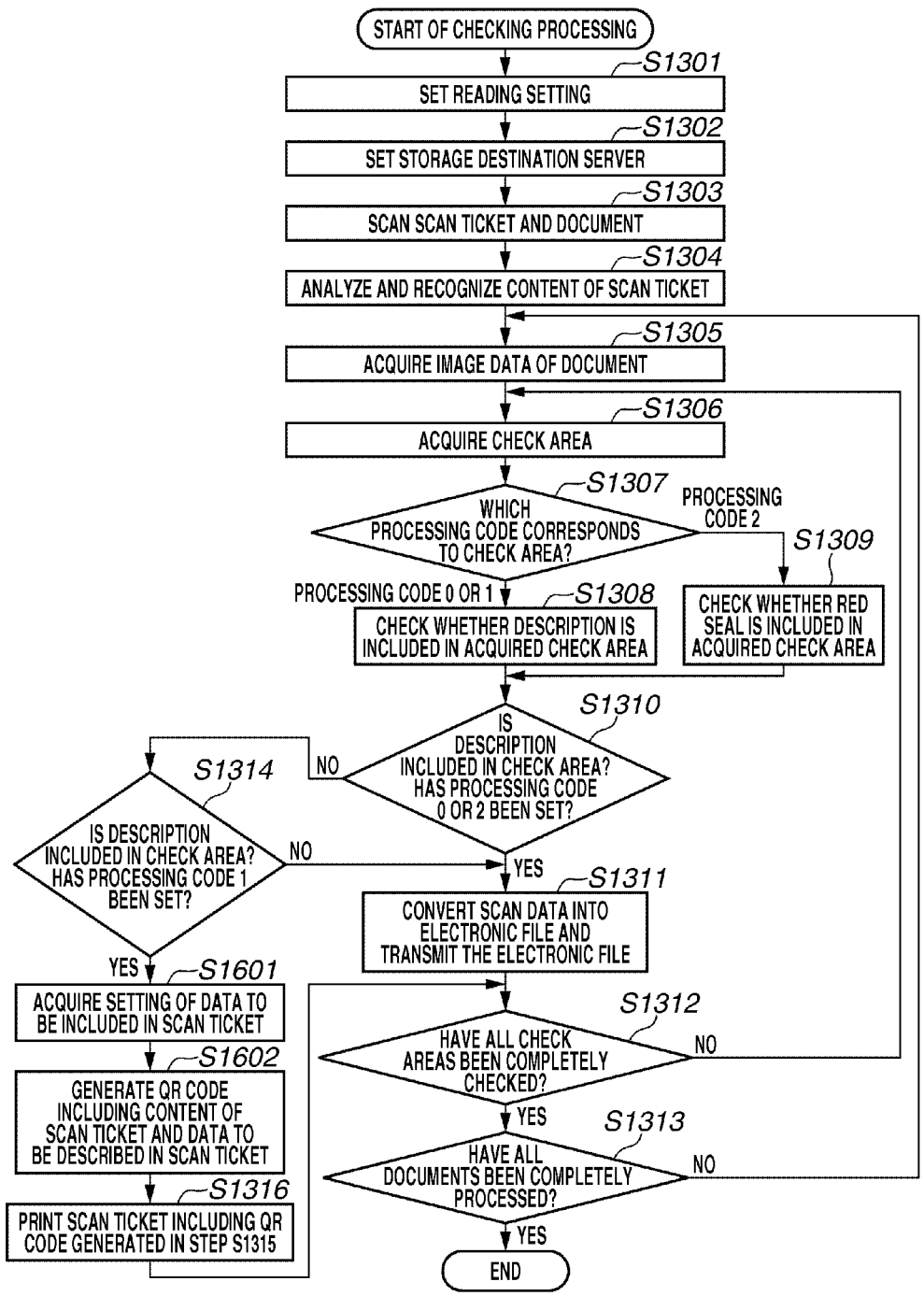
FIG. 12 is a flow chart illustrating an example of processing for checking a document by using a scan ticket according to a third exemplary embodiment of the present invention.

FIG. 12 is a flow chart illustrating an example of processing for printing a scan ticket to be used in corrected document re-storage processing according to the present exemplary embodiment. The processing in the flowchart of FIG. 12 is implemented by the CPU 11 by loading and executing, from the ROM 19 on the RAM 18, a program for executing each processing of the flow chart of FIG. 12.

Referring to FIG. 12, processing in steps S1301 through S1314 and step S1316 is similar to the processing in steps S1301 through S1314 and step S1316 illustrated in FIG. 7. On the other hand, processing in steps S1601 and S1602 is different from the processing in step S1315 illustrated in FIG. 7. If the result of the checking in step S1314 is negative, then the processing advances to step S1601. In step S1601, the CPU 11 acquires setting information 1701 (FIG. 13) about data to be included in the scan ticket. The setting information 1701 is set by the user via the operation unit 16.

Items that has been set ON in the setting information field 1701 is handled as the data to be included in the scan ticket. More specifically, in the example illustrated in FIG. 13, the storage destination setting has been set ON, the reading setting has been set ON, and the page number of page(s) whose result of checking is negative has been set OFF. Accordingly, in this case, the scan ticket includes the storage destination setting and the reading setting.

In step S1602, the CPU 11 regenerates the QR code to be used in corrected document re-storage processing based on the information about the setting acquired in step S1601 and the data including the processing instruction information generated based on decoded QR code 800 of the scan ticket (FIG. 6). In this case, the setting information acquired in step S1601 includes the reading setting information set in step S1301 and the storage destination set in step S1302.

In step S1316, the CPU 11 generates image data of the scan ticket used for re-storage processing (FIG. 10B) by using the QR code generated in step S1602 and transmits the generated image data to the printer 14. Then, the image data of the scan ticket to be used in corrected document re-storage processing (FIG. 10B) is printed by the printer 14.

The QR code 850 of the scan ticket to be used in corrected document re-storage processing (FIG. 10B) includes the reading setting information set in step S1301 and the storage destination information set in step S1302 as well as the processing instruction information described in the original scan ticket (FIG. 6). In addition, the storage destination information 1104 and the reading setting information 1105 is described in the scan ticket to be used for re-storing the corrected document so that the storage destination and the reading setting information can also be visually recognized.

In the present exemplary embodiment, the reading resolution and the file format are used as the reading setting information. However, all of or apart of reading settings that can be set in executing scanning, i.e., a setting, such as a reading density and/or a reading magnification, can be used as the reading setting information.

FIG. 10C illustrates an example of a scan ticket to be used in corrected document re-storage processing used if the storage destination setting and the page number of page(s) whose result of checking is negative have been set ON while the reading setting has been set OFF in the setting illustrated in FIG. 13.

According to the present exemplary embodiment described above, the user can select the information to be included in the scan ticket used for corrected document re-storage processing. Therefore, the user can execute checking by using the same storage destination setting as that used in the first scanning while changing only the reading setting from that set in the first scanning. Accordingly, the present exemplary embodiment can increase the alternative of processing executed by the user. Therefore, the present exemplary embodiment can improve the operability of the user.

Now, a fourth exemplary embodiment of the present invention will be described in detail below. The present exemplary embodiment is different from the above-described first through the third exemplary embodiments in the following point. More specifically, in the present exemplary embodiment, the user can select whether to generate a scan ticket to be used in corrected document re-storage processing if the result of checking the document is positive. In the present exemplary embodiment, units, components, and configurations similar to those of the first exemplary embodiment are provided with the same reference numerals, symbols, and step numbers. Accordingly, the detailed description thereof will not be repeated here and difference points only will be described in detail.

Figure 14:
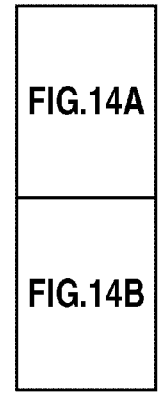
FIG. 14 is a flow chart illustrating an example of processing for checking a document by using a scan ticket according to a fourth exemplary embodiment of the present invention.
Figure 14A:
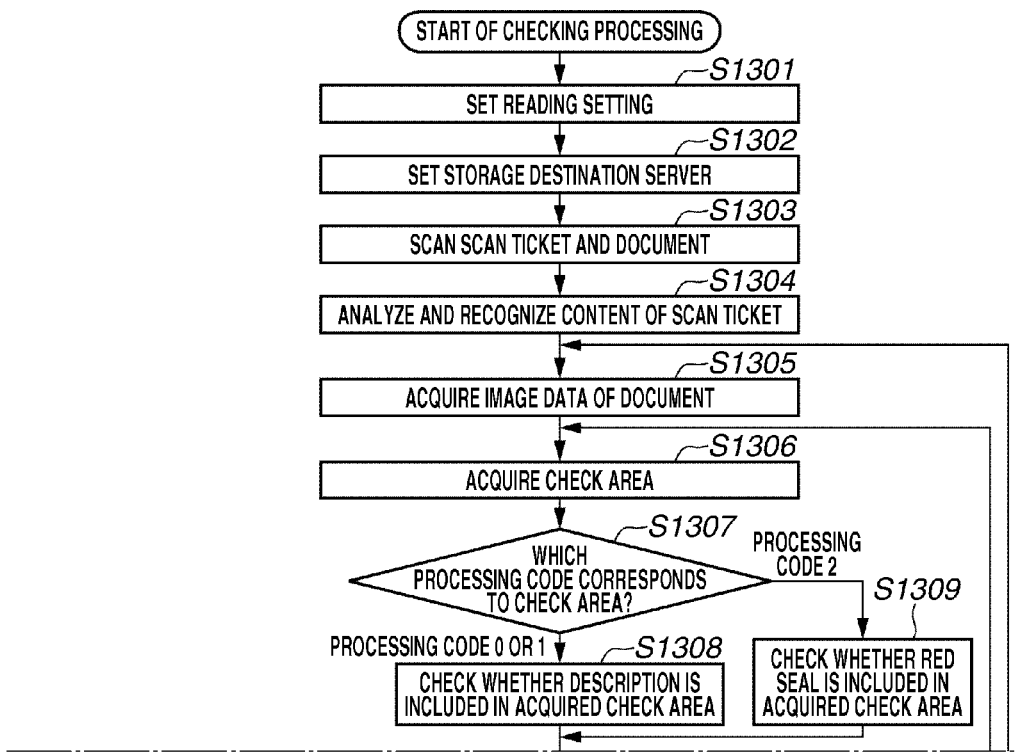
Figure 14B:
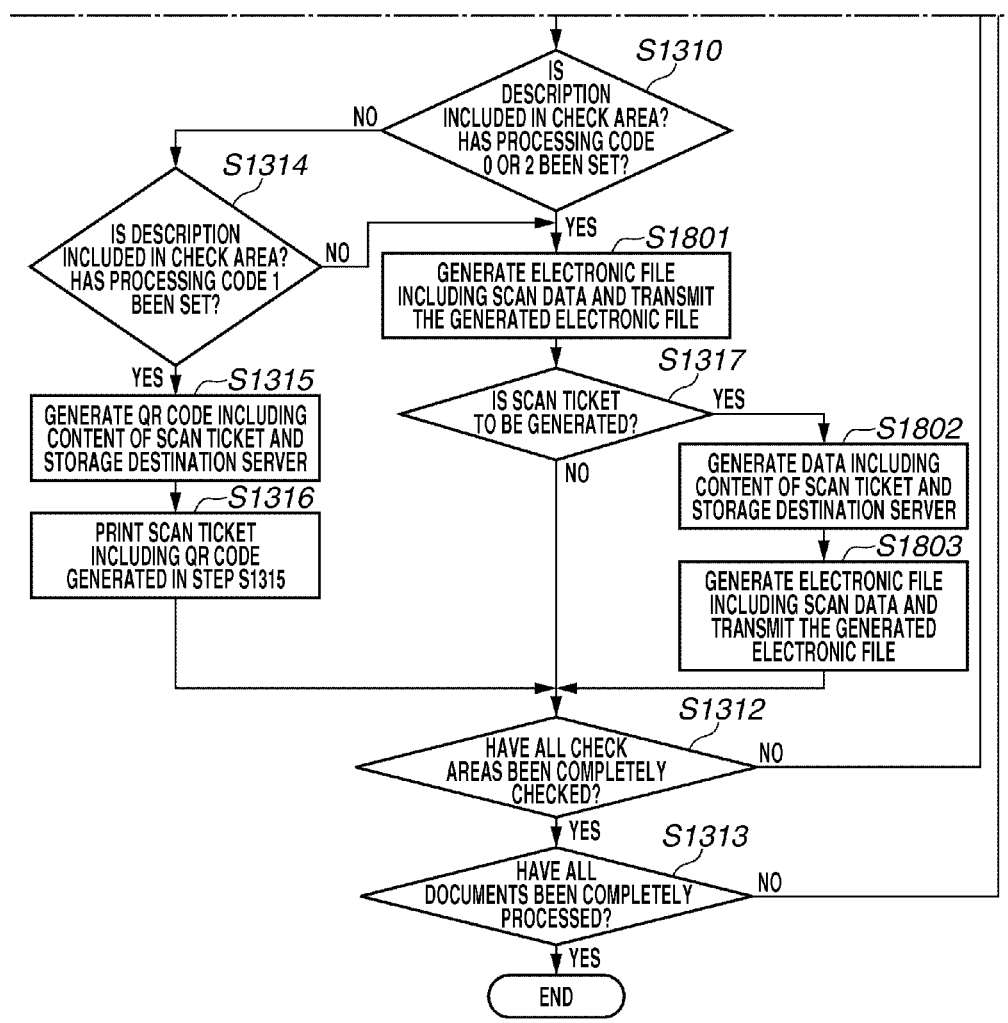

FIG. 14 is a flow chart illustrating an example of processing for printing a scan ticket to be used in corrected document re-storage processing according to the present exemplary embodiment. The processing in the flowchart of FIG. 14 is implemented by the CPU 11 by loading and executing, from the ROM 19 on the RAM 18, a program for executing each processing of the flow chart of FIG. 14.

Referring to FIG. 14, processing in steps S1301 through S1316 is similar to the processing in steps S1301 through S1316 illustrated in FIG. 7. Furthermore, in the example illustrated in FIG. 14, processing in steps S1801 through 1803 is executed in addition to the processing in the flowchart of FIG. 7. If it is determined that the description in the processing target field is normal in step S1310 or S1314, then the processing advances to step S1801.

In step S1801, the user enters an instruction as to whether to generate image data of the scan ticket to be used in corrected document re-storage processing (instruction input processing). If the user has issued an instruction to generate image data of the scan ticket to be used in corrected document re-storage processing (Yes in step S1801), then the processing advances to step S1802. On the other hand, if the user has not given an instruction to generate image data of the scan ticket to be used in corrected document re-storage processing (No in step S1801), then the processing advances to step S1312. The CPU 11 acquires information 1901, which describes information about whether to generate the scan ticket.

Figure 15:
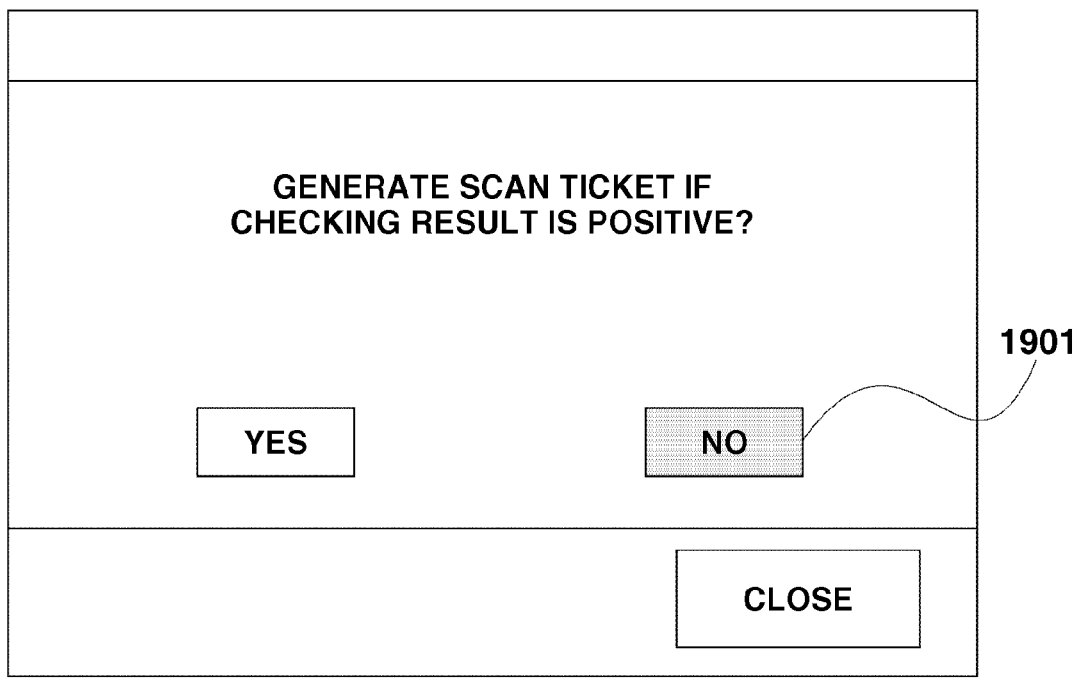
FIG. 15 illustrates an example of a screen for shifting to another screen for generating a scan ticket.

The information 1901 illustrated to FIG. 15 is set by the user via the operation unit 16. If the user sets (inputs) "No" for the information 1901, then the processing in step S1312 described above is executed. On the other hand, if the user sets (inputs) "Yes" for the information 1901, then the processing advances to step S1802. In step S1802, the CPU 11 executes the same processing as that in step S1305 described above.

In step S1803, the CPU 11 generates image data of the scan ticket used for re-storage processing (FIG. 10A) by using the QR code generated in step S1802 and converts the image data into image data having an arbitrary file format, such as PDF. Furthermore, the CPU 11 transmits the converted image data to the storage destination set in step S1302 via the network I/F 17.

In the present exemplary embodiment, the image data is transmitted to the storage destination on the network via the network I/F 17. However, the present exemplary embodiment is not limited to this. More specifically, the converted image data can be stored on the HDD 13 instead of storing the same on a network folder.

Although not described in the present exemplary embodiment, in generating a scan ticket to be used in corrected document re-storage processing, it is also useful if the user is allowed to select data to be included in the scan ticket as described above in the third exemplary embodiment.

According to the present exemplary embodiment, if the result of checking a document is positive, the user is allowed to generate a scan ticket and store the generated scan ticket as electronic data. With the above-described configuration, the present exemplary embodiment can allow the user to utilize the stored scan ticket even if the user has lost the original scan ticket or if a check target document is added later. Accordingly, the present exemplary embodiment can improve the convenience of the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2009-239402 filed Oct. 16, 2009, which is hereby incorporated by reference herein in its entirety.

What is claimed is:

1. An image processing apparatus comprising:
a storage destination setting unit configured to set a storage destination for storing image data acquired by reading an image of a document by using a reading unit;
an input unit configured to input first image data, which is acquired by reading an image of the document by using the reading unit, and second image data, which is acquired by reading an image of a document including a description of a processing instruction by using the reading unit;
a determination unit configured to acquire processing instruction information by analyzing the second image data and to determine whether a description included in a processing target field included in the first image data is appropriate according to processing target field information and a processing code included in the acquired processing instruction information;
a transmission unit configured, if it is determined by the determination unit that the description in the processing target field is appropriate, to transmit the first image data to the storage destination set by the storage destination setting unit;
a generation unit configured, if it is determined by the determination unit that the description in the processing target field is not appropriate, to generate processing instruction information to be used in re-storage processing including the storage destination; and
an output unit configured to output data including the processing instruction information generated by the generation unit to a printing unit.

2. The image processing apparatus according to claim 1,
wherein the determination unit is configured to determine the processing target field of the first image data based on the processing target field information included in the acquired processing instruction information,
wherein the determination unit is configured, if the processing code indicates that a description exists within the processing target field and if a description actually exists within the processing target field of the first image data, to determine that the description in the processing target field of the first image data is appropriate, and
wherein the determination unit is configured, if the processing code indicates that a description exists within the processing target field and if a description does not actually exist within the processing target field of the first image data, to determine that the description in the processing target field of the first image data is not appropriate.

3. The image processing apparatus according to claim 1,
wherein the determination unit is configured to determine the processing target field of the first image data based on the processing target field information included in the acquired processing instruction information,
wherein the determination unit is configured, if the processing code indicates that a description does not exist within the processing target field and if a description does not actually exist within the processing target field of the first image data, to determine that the description in the processing target field of the first image data is appropriate, and
wherein the determination unit is configured, if the processing code indicates that a description does not exist within the processing target field and if a description actually exists within the processing target field of the first image data, to determine that the description in the processing target field of the first image data is not appropriate.

4. The image processing apparatus according to claim 1, further comprising:
a reading setting unit configured to make a reading setting used in reading an image of a document by using the reading unit,
wherein in the input unit, the reading unit is configured to read an image of the document according to the reading setting made by the reading setting unit, and
wherein the generation unit is configured to generate processing instruction information to be used in re-storage processing that includes the reading setting in addition to the storage destination.

5. The image processing apparatus according to claim 1, wherein the processing instruction information is included in a Quick Response (QR) code.

6. The image processing apparatus according to claim 1, further comprising:
a reading setting unit configured to make a reading setting used in reading an image of a document by using the reading unit; and
a selection unit configured to allow a user to select information to be included in the processing instruction information generated by the generation unit from among the storage destination of the image data set by the storage destination setting unit, the reading setting made by the reading setting unit, and a page number of a page whose description in the processing target field has not been determined by the determination unit to be appropriate.

7. The image processing apparatus according to claim 1, further comprising an instruction input unit configured, if it is determined by the determination unit that the description in the processing target field is appropriate, to allow a user to input an instruction as to whether to generate processing instruction information to be used in re-storage processing that includes the storage destination, wherein the generation unit is configured, if an instruction for generating processing instruction information to be used in re-storage processing that includes the storage destination has been input by the instruction input unit, to generate processing instruction information to be used in re-storage processing that includes the storage destination.

8. A method for controlling an image processing apparatus, the method comprising:

setting a storage destination for storing image data acquired by reading an image of a document by using a reading unit;

inputting first image data, which is acquired by reading an image of the document by using the reading unit, and second image data, which is acquired by reading an image of a document including a description of a processing instruction by using the reading unit;

acquiring processing instruction information by analyzing the second image data;

determining whether a description included in a processing target field included in the first image data is appropriate according to processing target field information and a processing code included in the acquired processing instruction information;

transmitting, if it is determined that the description in the processing target field is appropriate, the first image data to the set storage destination;

generating, if it is determined that the description in the processing target field is not appropriate, processing instruction information to be used in re-storage processing including the storage destination; and outputting data including the generated processing instruction information to a printing unit.

9. A non-transitory computer-readable storage medium storing a computer-executable process, the computer-executable process causing a computer to perform a method comprising:

setting a storage destination for storing image data acquired by reading an image of a document by using a reading unit;

inputting first image data, which is acquired by reading an image of the document by using the reading unit, and second image data, which is acquired by reading an image of a document including a description of a processing instruction by using the reading unit;

acquiring processing instruction information by analyzing the second image data;

determining whether a description included in a processing target field included in the first image data is appropriate according to processing target field information and a processing code included in the acquired processing instruction information;

transmitting, if it is determined that the description in the processing target field is appropriate, the first image data to the set storage destination;

generating, if it is determined that the description in the processing target field is not appropriate, processing instruction information to be used in re-storage processing including the storage destination; and outputting data including the generated processing instruction information to a printing unit.

* * * * *